United States Patent
Yang et al.

(10) Patent No.: US 12,150,055 B2
(45) Date of Patent: Nov. 19, 2024

(54) METHOD AND APPARATUS FOR TRANSMITTING AND RECEIVING SIGNAL, STORAGE MEDIUM AND ELECTRONIC APPARATUS

(71) Applicant: ZTE Corporation, Shenzhen (CN)

(72) Inventors: Weiwei Yang, Shenzhen (CN); Bo Dai, Shenzhen (CN); Kun Liu, Shenzhen (CN); Huiying Fang, Shenzhen (CN); Luanjian Bian, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 777 days.

(21) Appl. No.: 17/267,181

(22) PCT Filed: Aug. 10, 2019

(86) PCT No.: PCT/CN2019/100106
§ 371 (c)(1),
(2) Date: Feb. 9, 2021

(87) PCT Pub. No.: WO2020/030161
PCT Pub. Date: Feb. 13, 2020

(65) Prior Publication Data
US 2021/0329552 A1    Oct. 21, 2021

(30) Foreign Application Priority Data

Aug. 10, 2018   (CN) .......................... 201810910219.3

(51) Int. Cl.
*H04W 52/02*    (2009.01)
*H04J 13/00*    (2011.01)
(Continued)

(52) U.S. Cl.
CPC ..... *H04W 52/0229* (2013.01); *H04J 13/0022* (2013.01); *H04J 13/004* (2013.01);
(Continued)

(58) Field of Classification Search
CPC ............. H04W 52/0229; H04W 76/28; H04W 68/005; H04W 72/0446; H04W 72/0453;
(Continued)

(56) References Cited

U.S. PATENT DOCUMENTS

2018/0270756 A1* 9/2018 Bhattad ................. H04W 76/27
2019/0239189 A1* 8/2019 Hwang ............. H04W 52/0216
(Continued)

FOREIGN PATENT DOCUMENTS

| CN | 108012312 A | 5/2018 |
|---|---|---|
| WO | 2018108265 A1 | 6/2018 |

OTHER PUBLICATIONS

Huawei, et al., "Feature Lead Summary on Detailed Design of Wake-up Signal in NB-Iot", 3GPP TSG RAN WGI Meeting #92bis R1-1805290, Apr. 17, 2018.
(Continued)

*Primary Examiner* — Liton Miah
(74) *Attorney, Agent, or Firm* — CANTOR COLBURN LLP

(57) ABSTRACT

A method and an apparatus for transmitting and receiving a signal, a storage medium and an electronic apparatus are provided. The method includes: determining transmission information of a group Wake up signal (WUS) according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals;
(Continued)

and transmitting the WUS according to the transmission information.

19 Claims, 2 Drawing Sheets

(51) Int. Cl.
   *H04W 68/00*      (2009.01)
   *H04W 72/04*      (2023.01)
   *H04W 72/0446*    (2023.01)
   *H04W 72/0453*    (2023.01)
   *H04W 72/23*      (2023.01)
   *H04W 76/28*      (2018.01)

(52) U.S. Cl.
   CPC ....... *H04J 13/0062* (2013.01); *H04W 68/005* (2013.01); *H04W 72/0446* (2013.01); *H04W 72/0453* (2013.01); *H04W 72/23* (2023.01); *H04W 76/28* (2018.02)

(58) Field of Classification Search
   CPC ..... H04W 72/23; H04W 24/10; H04W 48/12; H04W 52/02; H04W 52/0219; H04W 76/27; H04J 13/0062; H04J 13/004; H04J 13/0022
   See application file for complete search history.

(56) References Cited

U.S. PATENT DOCUMENTS

| | | | |
|---|---|---|---|
| 2019/0320490 A1* | 10/2019 | Liu | H04W 72/23 |
| 2019/0349856 A1* | 11/2019 | Liu | H04W 52/0216 |
| 2020/0022082 A1* | 1/2020 | Ljung | H04J 13/0048 |
| 2020/0029302 A1* | 1/2020 | Cox | H04W 52/0216 |
| 2020/0145921 A1* | 5/2020 | Zhang | H04W 52/0235 |
| 2020/0229095 A1* | 7/2020 | Shrestha | H04W 68/00 |
| 2021/0014825 A1* | 1/2021 | Shi | H04W 52/0245 |
| 2021/0306951 A1* | 9/2021 | Hwang | H04W 52/0235 |

OTHER PUBLICATIONS

Intel Corporation, "Open Issue in WUS", 3GPP TSG RAN WG2 Meeting #102 R2-1807524, May 10, 2018.
International Search Report for corresponding application PCT/CN2019/100106 filed Aug. 10, 2019; Mail date Oct. 24, 2019.
Mediatek Inc, "Wake Up Signal Configuration for NB-Iot", 3GPP RSG RAN WG1 Meeting #9bis R1-1804139, Apr. 5, 2018.
Huawei, HiSilicon, "On 'wake-up signal' for eFeMTC", 3GPP TSG RAN WG1 Meeting #92, Athens, Greece, Feb. 26-Mar. 2, 2018, R1-1801430.
Vivo, "Remaining aspects on configurations and procedures of wake-up signals for feNBIoT", 3GPP TSG RAN WG1 Meeting #93, Busan, Korea, May 21-25, 2018, R1-1806032.
ZTE, "Power consumption reduction for physical channels for MTC", 3GPP TSG RAN WG1 Meeting #90, Prague, Czech Republic, Aug. 21-25, 2017, R1-1713014.

* cited by examiner

METHOD AND APPARATUS FOR TRANSMITTING AND RECEIVING SIGNAL, STORAGE MEDIUM AND ELECTRONIC APPARATUS

CROSS-REFERENCE TO RELATED APPLICATION

The present disclosure claims priority to Chinese Patent Application No. 201810910219.3 filed to the China National Intellectual Property Administration (CNIPA) on Aug. 10, 2018, the disclosure of which is hereby incorporated by reference in its entirety.

TECHNICAL FIELD

The present disclosure relates to the field of communications, and in particular, relates to a method and an apparatus for transmitting and receiving a signal, a storage medium and an electronic apparatus.

BACKGROUND

Machine Type Communications (MTC for short), also known as Machine to Machine (M2M for short), is a main application form of Internet of Things. MTC apparatuses deployed on the market are mainly based on the Global System of Mobile Communication (GSM for short) system. In recent years, due to high spectrum efficiency of Long Term Evolution (LTE for short)/Long Term Evolution-Advanced (LTE-A for short), more and more mobile operators choose LTE/LTE-A as an evolution direction of broadband wireless communication systems in the future. Multiple types of LTE/LTE-A-based MTC data services are also more attractive.

Several technologies applicable to Comb-Internet of Things (C-IOT for short) are disclosed in a technical report TR 45.820V200 of the 3rd Generation Partnership Project (3GPP for short). Among these technologies, a Narrow band-Internet Of Things (NB-IoT for short) technology is the most attractive. An NB-IOT system focuses on a radio frequency access technology with low complexity and low throughput, and the main research targets thereof include: improved indoor coverage, support of a large amount of user equipment with low throughput, low delay sensitivity, ultralow equipment cost, low equipment power loss, and simple network architecture.

A network can page User Equipment (UE for short) in an idle state and a connected state. A paging process can be triggered by a core network to notify certain UE to receive a paging request, or triggered by an Evolved Node B (eNB) to notify update of system information. A paging message is scheduled by using a Physical Downlink Control Channel (PDCCH for short) scrambled by a P-Radio Network Temporary Identifier (P-RNTI for short), and is transmitted on a Physical Downlink Shared Channel (PDSCH for short). A UE detects a corresponding PDCCH at a Paging Occasion (PO for short) so as to determine whether a PDSCH indicated by the PDCCH bears the paging message. If the UE does not detect a corresponding PDCCH at the PO, it means that there is no paging message at this PO, and in such a case, the UE enters a sleep state and does not receive data, and performs detection again until the next PO. This reception process is referred to as Discontinuous Reception (DRX for short). That is to say, the UE needs to perform blind detection of PDCCH at each PO, and thus the power consumption of the UE is relatively high.

SUMMARY

Some embodiments of the present disclosure provide a method and an apparatus for transmitting and receiving a signal, a storage medium and an electronic apparatus.

According to some embodiments of the present disclosure, a method for transmitting a signal is provided. The method includes the following operations. Transmission information of a group Wake up signal (WUS) is determined according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals. The group WUS is transmitted according to the transmission information.

According to other embodiments of the present disclosure, a method for receiving a signal is provided. The method includes the following operations. A group Wake up signal (WUS) transmitted by a base station is received. The group WUS is detected according to a group index of the group Wake up signal (WUS) corresponding to a terminal and configuration information of the group WUS, wherein the group WUS is a WUS corresponding to a group of one or more terminals.

According to other embodiments of the present disclosure, an apparatus for transmitting a signal is provided, which is applied to a base station and includes: a determination module, configured to determine transmission information of a group Wake up signal (WUS) according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals; and a transmission module, configured to transmit the group WUS according to the transmission information.

According to other embodiments of the present disclosure, an apparatus for receiving a signal is provided, which is applied to a terminal and includes: a reception module, configured to receive a group Wake up signal transmitted by a base station; and a detection module, configured to detect the group WUS according to a group index of the group WUS corresponding to a terminal and configuration information of the group WUS, wherein the group WUS is a WUS corresponding to a group of one or more terminals.

According to other embodiments of the present disclosure, a storage medium is also provided. The storage medium has computer programs stored therein, wherein the computer programs are configured to execute, when running, operations in any one of the method embodiments.

According to other embodiments of the present disclosure, an electronic apparatus is also provided. The electronic apparatus includes a memory and a processor. Computer programs are stored in the memory, and the processor is configured to run the computer programs to execute operations in any one of the method embodiments.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

In order to reduce the power consumption of the UE, a Wake up signal (WUS for short) is introduced. A base station transmits a signal indicating whether to perform PDCCH detection before each PO, the UE first detects a WUS and determines whether to detect a corresponding PDCCH according to the detection result of the WUS. If a WUS is detected, the UE detects a PDCCH corresponding to the WUS, and if a WUS is not detected, the UE does not detect a PDCCH. The introduction of the WUS reduces the number of times that the UE detects a PDCCH, thereby saving the power consumption of the UE. However, the WUS is directed to all UEs at a PO, that is, if one UE needs to be woken up, the base station will transmit a WUS, which will wake up all the other UEs belonging to the same PO. Since these UEs will detect the PDCCH, the number of times of unnecessary PDCCH detection performed by the UE will be increased.

Therefore, no effective solution has been proposed for the problem in the related art of non-obvious power consumption reduction effect of a UE caused by large number of times of unnecessary PDCCH detection performed by the UE. A method and apparatus for transmitting and receiving a signal, a storage medium and an electronic apparatus are provided in the embodiments of the present disclosure. According to the scheme of the embodiments of the present disclosure, transmission information of a group Wake up signal (WUS) is determined according to at least one of the following configuration information: a sequence corresponding to a group WUS, time domain location information corresponding to the group WUS, and frequency domain location information corresponding to the group WUS, wherein the group WUS is a WUS corresponding to a group of one or more terminals; and the group WUS is transmitted according to the transmission information. That is to say, by transmitting a group WUS, one or more terminals corresponding to the group WUS are woken up to detect a PDCCH, rather than all terminals being woken up to detect the PDCCH. The scheme solves the problem in the related art of non-obvious power consumption reduction effect of a terminal caused by high number of times of unnecessary PDCCH detections performed by the terminal, and achieves the technical effect of further reducing the power consumption of the terminal.

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Embodiment 1

Figure 1:
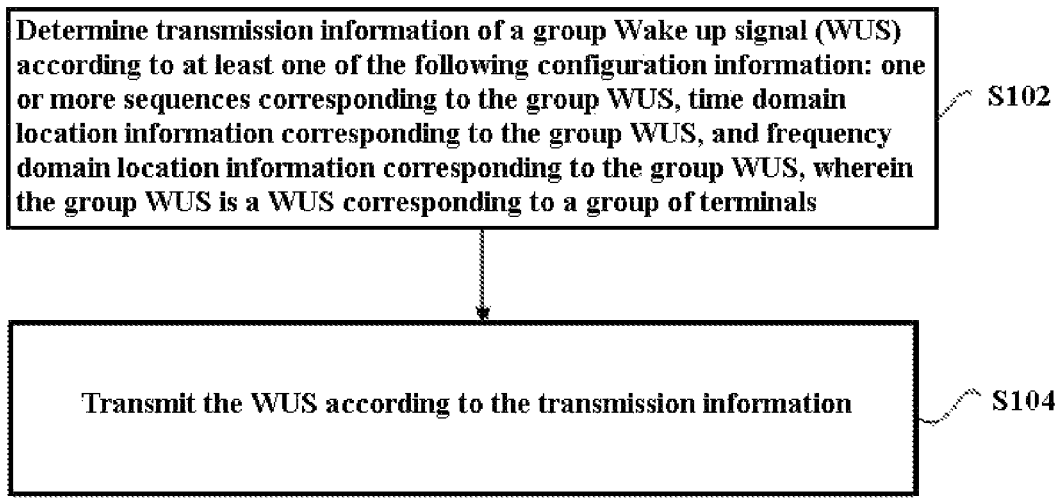
FIG. 1 is a flowchart of a method for transmitting a signal according to some embodiments of the present disclosure.

In the present embodiment, a method for transmitting a signal is provided. FIG. 1 is a flowchart of the method for transmitting a signal according to some embodiments of the present disclosure. As shown in FIG. 1, the flow includes operations S102 and S104.

At S102, transmission information of a group Wake up signal (WUS) is determined according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals.

In one or more exemplary implementations of the present embodiment, the one or more sequences corresponding to the group WUS include at least one of: a ZC (Zadoff-Chu) sequence, a Pseudo-noise (PN) sequence, and an orthogonal sequence. When the sequence corresponding to the group WUS is the ZC sequence, a cyclic shift of the ZC sequence corresponding to the group WUS is determined at least according to a group index corresponding to the group WUS. When the sequences corresponding to the group WUS are the ZC sequence and the PN sequence, an initial value of the PN sequence corresponding to the group WUS is determined at least according to the group index corresponding to the group WUS. When the sequences corresponding to the group WUS are the ZC sequence, a first PN sequence and a second PN sequence, an initial value of the second PN sequence corresponding to the group WUS is determined at least according to the group index corresponding to the group WUS. When the sequence corresponding to the group WUS is the PN sequence, an initial value of the PN sequence corresponding to the group WUS is determined at least according to the group index corresponding to the group WUS. When the sequence corresponding to the group WUS includes the orthogonal sequence, a sequence index of the orthogonal sequence is determined at least according to the group index corresponding to the group WUS.

In one or more exemplary implementations of the present embodiment, the frequency domain location information corresponding to the group WUS at least includes: a start resource location in a narrowband where the group WUS is located.

In one or more exemplary implementations of the present embodiment, the time domain location information corresponding to the group WUS includes at least one of: an interval between the group WUS and a Paging Occasion (PO), an offset of the group WUS with respect to a size of a Physical Downlink Control Channel (PDCCH) search space, and a start position of the group WUS in a search space.

The interval between the group WUS and the PO and the offset of the group WUS with respect to the size of the PDCCH search space may be configured by first signalling. Alternatively or additionally, the interval between the group WUS and the PO, the offset with respect to the size of the PDCCH search space, and the start position of the group WUS in the search space may be configured by second signalling.

In one or more exemplary implementations of the present embodiment, group WUSs corresponding to the same PO have the same offset with respect to the size of the PDCCH search space.

In one or more exemplary implementations of the present embodiment, when any one of the group WUSs corresponding to the same PO has a length greater than or equal to X1, the intervals between the PO and the group WUSs corresponding to the same PO are different; and when the group WUS has a length smaller than X2, the intervals between the PO and the group WUSs corresponding to the same PO are the same, wherein X1 and X2 are positive integers greater than or equal to 0.

In one or more exemplary implementations of the present embodiment, when any one of the group WUSs corresponding to the same PO has a length equal to X3, the intervals between the PO and the group WUSs corresponding to the same PO are different; and when the group WUS has a length equal to X4, the intervals between the PO and the group WUSs corresponding to the same PO are the same, wherein X3 and X4 are positive integers greater than or equal to 0.

At S104, the group WUS is transmitted according to the transmission information.

In one or more exemplary implementations of the present embodiment, an execution subject of the operations may be a base station, but is not limited thereto.

In one or more exemplary implementations of the present embodiment, the execution sequence of the operation S102 and the operation S104 may be interchanged, that is, the operation S104 may be executed first, and then the operation S102 is executed.

By means of the operations S102 and S104, transmission information of a group Wake up signal (WUS) is determined according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals; and the group WUS is transmitted according to the transmission information. That is to say, by transmitting a group WUS, one or more terminals corresponding to the group WUS are woken up to detect a PDCCH, rather than all terminals being woken up to detect the PDCCH. The scheme solves the problem in the related art of non-obvious power consumption reduction effect of a terminal caused by high number of times of unnecessary PDCCH detections performed by the terminal, and achieves the technical effect of further reducing the power consumption of the terminal.

Figure 2:
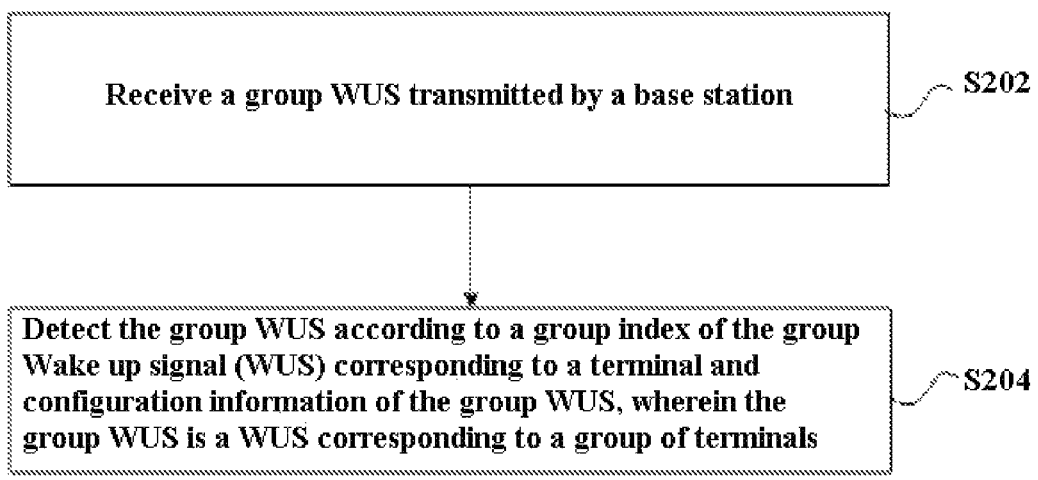
FIG. 2 is a flowchart of a method for receiving a signal according to some embodiments of the present disclosure.

In the present embodiment, a method for receiving a signal is also provided. FIG. 2 is a flowchart of the method for receiving a signal according to some embodiments of the present disclosure. As shown in FIG. 2, the flow includes operations S202 and S204.

At S202, a group WUS transmitted by a base station is received.

At S204, the group WUS is detected according to a group index of the group Wake up signal (WUS) corresponding to a terminal and configuration information of the group WUS, wherein the group WUS is a WUS corresponding to a group of one or more terminals.

In one or more exemplary implementations of the present embodiment, the group index of the group WUS is determined according to a first terminal index, wherein the first terminal index is at least related to a Discontinuous Reception (DRX) cycle period, a radio frame index, a DRX cycle index, a second terminal index and an index of a cell where the terminal is located.

In one or more exemplary implementations of the present embodiment, the configuration information of the group WUS includes at least one of: one or more sequences corresponding to the group WUS, time domain location information corresponding to the group WUS, and frequency domain location information corresponding to the group WUS.

The one or more sequences corresponding to the group WUS include at least one of: a ZC sequence, a PN sequence, and an orthogonal sequence. When the sequence corresponding to the group WUS is the ZC sequence, a cyclic shift of the ZC sequence corresponding to the group WUS is determined at least according to a group index corresponding to the group WUS. When the sequences corresponding to the group WUS are the ZC sequence and the PN sequence, an initial value of the PN sequence corresponding to the group WUS is determined at least according to the group index corresponding to the group WUS. When the sequences corresponding to the group WUS are the ZC sequence, a first PN sequence and a second PN sequence, an initial value of the second PN sequence corresponding to the group WUS is determined at least according to the group index corresponding to the group WUS. When the sequence corresponding to the group WUS is the PN sequence, an initial value of the PN sequence corresponding to the group WUS is determined at least according to the group index corresponding to the group WUS. When the sequence corresponding to the group WUS includes the orthogonal sequence, a sequence index of the orthogonal sequence is determined at least according to the group index corresponding to the group WUS.

In one or more exemplary implementations of the present embodiment, the frequency domain location information corresponding to the group WUS at least includes: a start resource location in a narrowband where the group WUS is located.

In one or more exemplary implementations of the present embodiment, the start resource location in the narrowband where the group WUS is located may be determined according to third signalling; or the start resource location in the narrowband where the group WUS is located may be determined according to a fixed start resource location in the narrowband where the group WUS is located; or the start resource location in the narrowband where the group WUS is located may be determined according to the group index corresponding to the group WUS.

In one or more exemplary implementations of the present embodiment, the time domain location information corresponding to the group WUS includes at least one of: an interval between the group WUS and a Paging Occasion (PO), an offset of the group WUS with respect to a size of a Physical Downlink Control Channel (PDCCH) search space, and a start position of the group WUS in a search space.

The time domain location information corresponding to the group WUS may be determined according to the interval between the group WUS and the PO and the offset of the group WUS relative to the size of the PDCCH search space, which are indicated by first signalling. The time domain location information corresponding to the group WUS may be determined according to the interval between the group WUS and the PO, the offset with respect to the size of the PDCCH search space and the start position of the group WUS in the search space, which are indicated by second signalling.

In one or more exemplary implementations of the present embodiment, an execution subject of the operations may be a terminal, but is not limited thereto.

In one or more exemplary implementations of the present embodiment, the execution sequence of the operation S202 and the operation S204 may be interchanged, that is, the operation S204 may be executed first, and then the operation S202 is executed.

By means of the operations S202 and S204, a group WUS transmitted by a base station is detected according to a group index of the group Wake up signal (WUS) corresponding to a terminal and configuration information of the group WUS, wherein the group WUS is a WUS corresponding to a group of one or more terminals. That is to say, by detecting a group WUS transmitted by a base station, one or more terminals corresponding to the group WUS are woken up to detect a PDCCH, rather than all terminals being woken up to detect the PDCCH.

The scheme solves the problem in the related art of non-obvious power consumption reduction effect of a terminal caused by high number of times of unnecessary PDCCH detections performed by the terminal, and achieves the technical effect of further reducing the power consumption of the terminal.

Hereinafter, the present embodiment is illustrated by examples in combination with exemplary embodiments and specific embodiments.

Exemplary Embodiment 1

Specific Embodiment 1

It is assumed that a PO corresponds to K groups of terminals (that is to say, all terminals at the PO are divided into K groups), that is, the PO corresponds to K group WUSs, each corresponding to a group index of k (k=0, 1, . . . , K−1). A sequence corresponding to the group WUS is:

$$w_k(m) = \theta n_f, n_s(m) * e^{-\frac{j\pi un(n+1)}{131}} * e^{-2\pi n\eta}$$

$$m = 0, 1, \ldots, 132M_{ki} - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$\eta = \frac{B}{132}((k+h))$$

In the above formulas, $M_k$ is a subframe required for transmitting the group WUS, $c_{n_f,n_s}(i)$, i=0, 1 . . . , 2*132$M_k$−1 is a PN sequence, and an initial value is $$c_{init\_WUS} = (N_{ID}^{Cell}+1)\left(\left(10n_{f\_start\_PO}+\left\lfloor\frac{n_{s\_start\_PO}}{2}\right\rfloor\right)\bmod 2048+1\right)*2^9 + N_{ID}^{Cell},$$

u=($N_{ID}^{Ncell}$ mod 126)+3, wherein $n_{f\_start\_PO}$ is the first radio frame of the first PO corresponding to the WUS, $n_{s\_start\_PO}$ is the first time slot corresponding to the PO, and $N_{ID}^{Cell}$ is a cell index. B is a preset value, or the specific value of B is related to the number of groups. For example, when the number of groups is 4, B=33; and when the number of groups is 2, B=66. Since the group index k in this specific embodiment is numbered from 0, h=1. If the group index k is numbered from 1, h=0, or h=1.

Specific Embodiment 2

It is assumed that a PO corresponds to K groups of terminals, that is, the PO corresponds to K group WUSs, each corresponding to a group index of k (k=0, 1, . . . , K−1). A sequence corresponding to the group WUS is:

$$w_k(m) = \theta n_f, n_s(m) * e^{-\frac{j\pi un(n+1)}{131}}$$

$$m = 0, 1, \ldots, 132M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

In the above formulas, $M_k$ is a subframe required for transmitting the group WUS, $c_{n_f,n_s}(i)$, i=0, 1, . . . , 2*32$M_k$−1 is a PN sequence, and an initial value is $$c_{init\_WUS} = (k+h)*2^{29} + (N_{ID}^{Cell}+1)\left(\left(10n_{f\_start\_PO}+\left\lfloor\frac{n_{s\_start\_PO}}{2}\right\rfloor\right)\bmod 2048+1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, u=($N_{ID}^{Ncell}$ mod 126)+3, and $N_{ID}^{Cell}$ is a cell index. B is a preset value, or the specific value of B is related to the number of groups. If the group index k is numbered from 0, h=1. If the group index k is numbered from 1, h=0, or h=1.

Specific Embodiment 3

It is assumed that a PO corresponds to K groups of terminals, that is, the PO corresponds to K group WUSs, each corresponding to a group index of k (k=0, 1, . . . , K−1). A basic sequence corresponding to the group WUS in a subframe x (x=0, 1, . . . , $M_k$−1) is:

$$w_k(m) = \theta n_f, n_s(m') * e^{-\frac{j\pi un(n+1)}{131}} * e^{-2\pi n\eta}$$

-continued $$m = 0, 1, \ldots, 131$$

$$m' = m + 132x$$

$$n = m \bmod 132$$

$$\theta_{n_f, n_s}(m) = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 0 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

$$\eta = \frac{B}{132}((k+h))$$

In the above formulas, $M_k$ is a subframe required for transmitting the group WUS, $c_{n_f,n_s}(i)$, $i=0, 1, \ldots, 2*32M_k-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. B is a preset value, or the specific value of B is related to the number of groups. For example, when the number of groups is 4, B=33; and when the number of groups is 2, B=66. If the group index k is numbered from 0, h=1. If the group index k is numbered from 1, h=0, or h=1.

Specific Embodiment 4

It is assumed that a PO corresponds to K groups of terminals, that is, the PO corresponds to K group WUSs, each corresponding to a group index of k (k=0, 1, ..., K-1). A basic sequence corresponding to the group WUS in a subframe x (x=0, 1, ..., $M_k-1$) is:

$$w_k(m) = \theta_{n_f, n_s}(m') * e^{-\frac{j\pi un(n+1)}{131}}$$

$$m = 0, 1, \ldots, 131$$

$$m' = m + 132x$$

$$n = m \bmod 132$$

$$\theta_{n_f, n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 0 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

In the above formulas, $M_k$ is a subframe required for transmitting the group WUS, $c_{n_f,n_s}(i)$, $i=0, 1, \ldots, 2*32M_k-1$ is a PN sequence, and an initial value is $$c_{init\_WUS} = (k+h)*2^{29} +$$
$$(N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. B is a preset value, or the specific value of B is related to the number of groups. If the group index k is numbered from 0, h=1. If the group index k is numbered from 1, h=0, or h=1.

Specific Embodiment 5

It is assumed that a PO corresponds to K groups of terminals, that is, the PO corresponds to K group WUSs, each corresponding to a group index of k (k=0, 1, ..., K-1). A basic sequence corresponding to the group WUS in a subframe x (x=0, 1, ..., $M_k-1$) is:

$$w_k(m) = \frac{1 - 2c(2m')}{\sqrt{2}} + j\frac{1 - 2c(2m'+1)}{\sqrt{2}}$$

$$m = 0, 1, \ldots, 131$$

$$m' = m + 132x$$

In the above formulas, c(i), $i=0, 1, \ldots, 2*32M_k-1$ is a PN sequence, an initial value is $$c_{init\_WUS} = (k+h)*2^{29} +$$
$$(N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, and $N_{ID}^{Cell}$ is a cell index. If the group index k is numbered from 0, h=1. If the group index k is numbered from 1, h=0 or h=1.

Specific Embodiment 6

It is assumed that a PO corresponds to K groups of terminals, that is, the PO corresponds to K group WUSs, each corresponding to a group index of k (k=0, 1, ..., K-1). A basic sequence corresponding to the group WUS in a subframe x (x=0, 1, ..., $M_k-1$) is:

$$w_k(m) = \theta_{n_f, n_s}(m') * e^{-\frac{j\pi un(n+1)}{131}} * \theta_k(m')$$

$$m = 0, 1, \ldots, 131$$

$$m' = m + 132x$$

$$n = m \bmod 132$$

$$\theta_{n_f, n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 0 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

$$\theta_k(m') = \begin{cases} 1, & \text{if } c_\eta(2m') = 0 \text{ and } c_\eta(2m'+1) = 0 \\ -1, & \text{if } c_\eta(2m') = 0 \text{ and } c_\eta(2m'+1) = 1 \\ j, & \text{if } c_\eta(2m') = 0 \text{ and } c_\eta(2m'+1) = 0 \\ -j, & \text{if } c_\eta(2m') = 1 \text{ and } c_\eta(2m'+1) = 1 \end{cases}$$

In the above formulas, $M_k$ is a subframe required for transmitting the group WUS, $c_{n_f,n_s}(i)$, i=0, 1, ..., $2*32M_k-1$ is a PN sequence, and an initial value is $$c_{init\_WUS} = (N_{ID}^{Cell} + 1)\left(\left(10n_{f\_start\_PO} + \left\lfloor\frac{n_{s\_start\_PO}}{2}\right\rfloor\right)\bmod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Herein, c (i), i=0, 1, ..., $2*32M_k-1$ is a PN sequences, and the initial value is at least related to the group index k.

Specific Embodiment 7

In an MTC system, it is assumed that a PO corresponds to K groups of terminals, that is, the PO corresponds to K group WUSs, each corresponding to a group index of k (k=0, 1, ..., K−1). By signalling configuration, an initial resource block index of the group WUS in a narrowband is fixed at 0.

A basic sequence corresponding to the group WUS in a subframe x (x=0, 1, ... $M_k-1$) is:

$$w_k(m) = \frac{1-2c(2m')}{\sqrt{2}} + j\frac{1-2c(2m'+1)}{\sqrt{2}}$$

$$m = 0, 1, \ldots, 131$$

$$m' = m + 132x$$

In the above formulas, c (i), i=0, 1, ..., $2*32M_k-1$ is a PN sequence, and an initial value is $$c_{init\_WUS} = (k+h)*2^{29} +$$
$$(N_{ID}^{Cell} + 1)\left(\left(10n_{f\_start\_PO} + \left\lfloor\frac{n_{s\_start\_PO}}{2}\right\rfloor\right)\bmod 2048 + 1\right)*2^9 + N_{ID}^{Cell} \text{ or,}$$
$$c_{init\_WUS} = (N_{ID}^{Cell} + 1)\left(\left(10n_{f\_start\_PO} + \left\lfloor\frac{n_{s\_start\_PO}}{2}\right\rfloor\right)\bmod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, and $N_{ID}^{Cell}$ is a cell index. If the group index k is numbered from 0, h=1. If the group index k is numbered from 1, h=0, or h=1. Other forms of basic sequences are not excluded.

Then, in a subframe x, a sequence corresponding to the group WUS on a resource block 0 is $w_1(0)*w_k(m)$, and a sequence corresponding to the group WUS on a resource block 1 is $w_1(1)*w_k(m)$. The values of w(j) are as shown in the following Table 1:

TABLE 1

| Group index | $w_1(0)$ | $w_1(1)$ |
|---|---|---|
| 1 | 1 | 1 |
| 2 | 1 | −1 |

Specific Embodiment 8

If K group WUSs transmitted are distinguished by different frequency domain locations and/or time domain locations, sequences corresponding to the K group WUSs may be the same, that is, in the Specific Embodiment 1 to Specific Embodiment 7, and when being used for determining the sequence, the value of k is a fixed value.

Exemplary Embodiment 2

Specific Embodiment 1

In an MTC system, it is assumed that there are two groups of terminals at a PO, the two groups of terminals correspond to a group WUS1 and a group WUS2 respectively, and both the group WUS1 and the group WUS2 need to be transmitted. An initial resource block index of the group WUS1 in a narrowband is configured as 0 by signalling, and an initial resource block index of the group WUS2 in the narrowband is configured as 3 by signalling.

A base station maps a sequence corresponding to the group WUS1 onto resource block indexes 0 and 1 in the narrowband for transmission, and maps a sequence corresponding to the group WUS2 onto resource block indexes 3 and 4 in the narrowband for transmission.

Specific Embodiment 2

In an MTC system, it is assumed that there are two groups of terminals at a PO, the two groups of terminals correspond to a group WUS1 and a group WUS2 respectively, and both the group WUS1 and the group WUS2 need to be transmitted. It is preset that: an initial resource block index of the group WUS1 in a narrowband is fixed at 0, an initial resource block index of the group WUS2 in the narrowband is fixed at 2, and an initial resource block index of a group WUS3 in the narrowband is fixed at 4.

A base station maps a sequence corresponding to the group WUS1 onto resource block indexes 0 and 1 in the narrowband for transmission, and maps a sequence corresponding to the group WUS2 onto resource block indexes 2 and 3 in the narrowband for transmission.

Exemplary Embodiment 3

Specific Embodiment 1

It is assumed that a PO corresponds to two groups of terminals, that is, the PO corresponds to two group WUSs, i.e., a group WUS1 and a group WUS2, and both the group WUS1 and the group WUS2 need to be transmitted. Corresponding interval g1 between the group WUS1 and the PO and corresponding interval g2 between the group WUS2 and the PO, and offsets a1 and a2 of the group WUS1 and the group WUS2 with respect to the size of a PDCCH search space (N offsets, N durations) are configured by signalling.

During transmission, an end position of a search space of the group WUS1 is determined according to g1; the length of the search space of the group WUS1 is determined according to the offset a1 of the group WUS1 relative to the size Rmax of the PDCCH search space, and the Rmax; a start position of the search space of the WUS1 is determined according to the end position and the length; and a base station transmits a sequence corresponding to the group WUS1 in the search space of the group WUS1.

During transmission, an end position of a search space of the group WUS2 is determined according to g2; the length of the search space of the group WUS2 is determined according to the offset a2 of the group WUS2 relative to the size Rmax of the PDCCH search space, and the Rmax; and a start position of the search space of the group WUS2 is determined according to the end position and the length; and the base station transmits a sequence corresponding to the group WUS2 in the search space of the group WUS2.

Specific Embodiment 2

Figure 3:
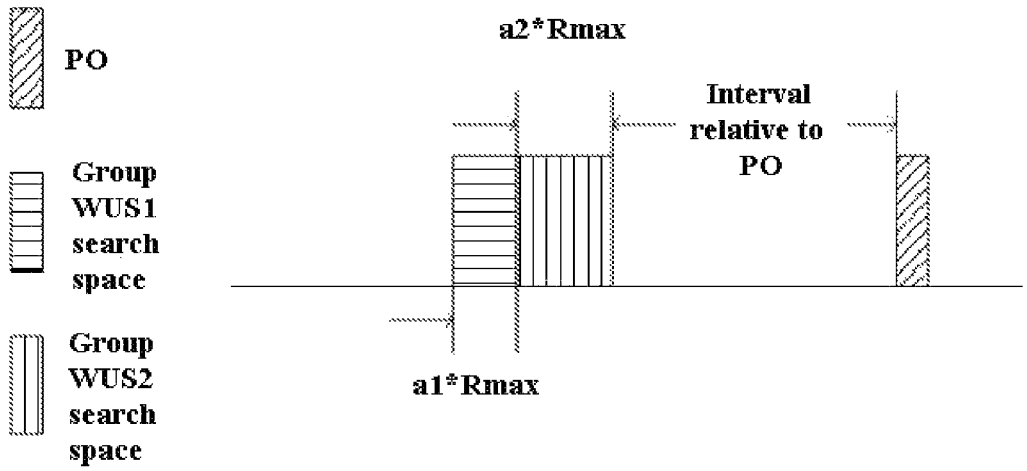
FIG. 3 is a flowchart (I) of a method for processing a signal according to some exemplary embodiments of the present disclosure.

It is assumed that a PO corresponds to two groups of terminals, that is, the PO corresponds to two group WUSs, i.e. a group WUS1 and a group WUS2, and both the group WUS1 and the group WUS2 need to be transmitted. As shown in FIG. 3 below, a corresponding interval relative to the PO, and offsets a1 and a2 of the group WUS1 and the group WUS2 with respect to the size of a PDCCH search space (1 offset, N durations) are configured by signalling.

During transmission, end positions of search spaces of both the group WUSs are determined according to g; the length of the search space of the group WUS1 is determined according to a1*Rmax; the length of the search space of the group WUS2 is determined according to a2*Rmax; and start positions of the search spaces of both the group WUSs are determined according to the lengths of the search spaces of the group WUS1 and the group WUS2.

Sequences corresponding to the group WUS1 and the group WUS2 are transmitted within corresponding search spaces in accordance with a preset search space sequence or in accordance with a search space sequence implicitly determined by group indexes (in the example given in FIG. 3, the search space of the group WUS1 is the first, and the search space of the group WUS2 is the next).

Specific Embodiment 3

Figure 4:
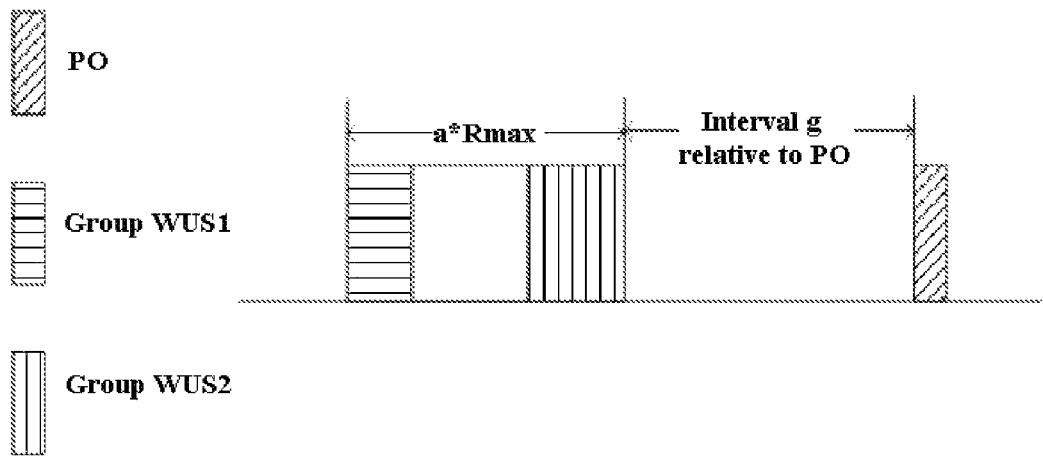
FIG. 4 is a flowchart (II) of a method for processing a signal according to some exemplary embodiments of the present disclosure.

It is assumed that a PO corresponds to two groups of terminals, that is, the PO corresponds to two group WUSs, i.e. a group WUS1 and a group WUS2, and both the group WUS1 and the group WUS2 need to be transmitted. As shown in FIG. 4 below, a corresponding interval g relative to the PO, an offset a relative to the size of a PDCCH search space (1 offset, 1 duration) and start positions of the group WUSs in the search space are configured by signalling. The start position of the group WUS1 in the search space is the start of the search space, and the start position of the group WUS2 in the search space is the end of the search space.

During transmission, end positions of search spaces of both the group WUSs are determined according to g; and the lengths and start positions of the search spaces of both the group WUSs are determined according to a*Rmax. A sequence corresponding to the group WUS1 is mapped from the start of the search space from front to back, and a sequence corresponding to the group WUS2 is mapped from the end of the search space from back to front.

Specific Embodiment 4

It is assumed that a PO corresponds to two groups of terminals, that is, the PO corresponds to two group WUSs, i.e., a group WUS1 and a group WUS2, and both the group WUS1 and the group WUS2 need to be transmitted. A corresponding interval g relative to the PO and an offset a relative to the size of a PDCCH search space (1 offset, 1 duration) and start positions of the group WUSs in the search space are configured by signalling.

During transmission, end positions of search spaces of both the group WUSs are determined according to g; and the lengths and start positions of the search spaces of both the group WUSs are determined according to a*Rmax. The start positions of the group WUSs are implicitly determined according to indexes of the group WUSs. For example, the start position of the group WUS1 is the start of the search space, and the start position of the group WUS2 is at the middle of the search space.

Specific Embodiment 5

It is assumed that a PO corresponds to two groups of terminals, that is, the PO corresponds to two group WUSs, i.e., a group WUS1 and a group WUS2, and both the group WUS1 and the group WUS2 need to be transmitted. A corresponding interval g relative to the PO and an offset a relative to the size of a PDCCH search space (1 offset, 1 duration) and start positions of the group WUSs in the search space are configured by signalling.

During transmission, end positions of search spaces of both the group WUSs are determined according to g; the lengths and start positions of the search spaces of both the group WUSs are determined according to a*Rmax; and start positions and end positions of the group WUSs are implicitly determined according to indexes of the group WUSs. For example, the start position of the group WUS1 is the start of the search space, the end position of the group WUS1 is the middle of the search space; and the start position of the group WUS2 is the middle of the search space, and the end position of the group WUS2 is the end of the search space.

In this exemplary embodiment, the intervals between the group WUSs and the PO are the intervals between the end positions of the search spaces where the group WUSs are located and the start position of the PO; and the intervals between the group WUSs and the PO further include the intervals between the end positions of the group WUSs and the start position of the PO.

Exemplary Embodiment 4

Specific Embodiment 1

In an NB-IoT system, it is assumed that a PO corresponds to two groups of terminals, that is, the PO corresponds to two group WUSs, i.e., a group WUS1 and a group WUS2, and both the group WUS1 and the group WUS2 need to be transmitted. A corresponding interval g relative to the PO and an offset a relative to the size of a PDCCH search space are configured by signalling.

During transmission, a corresponding sequence is $w_1(m)$, $w_2(m)$, specifically as described in Embodiment 3, and thus it will not be repeated herein.

During transmission, corresponding time domain locations are determined in the following manner: end positions of search spaces of both the WUSs are determined according to g, lengths and start positions of the search spaces of both the group WUSs are determined according to a*Rmax, and $w_k(m)$ is transmitted in the determined search space.

Specific Embodiment 2

In an MTC system, it is assumed that a PO corresponds to two groups of terminals, that is, the PO corresponds to two group WUSs, i.e., a group WUS1 and a group WUS2, and both the group WUS1 and the group WUS2 need to be transmitted. Corresponding group indexes of the two group WUSs are 1 and 2 respectively. A corresponding interval g relative to the PO and an offset a relative to the size of a PDCCH search space are configured by signaling. Initial resource block indexes of the group WUSs in a narrowband are configured as 0 by signalling.

During transmission, a corresponding sequence is $w_1(m)$, $w_2(m)$, specifically as described in Embodiment 3, and it will not be repeated herein.

During transmission, corresponding time domain locations are determined in the following manner: end positions of search spaces of both the group WUSs are determined according to g, lengths and start positions of the search spaces of both the group WUSs are determined according to a*Rmax, and $w_k(m)$ is transmitted in the determined search space.

During transmission, corresponding frequency domain locations are: resource block indexes 0 and 1 mapped into the narrowband.

Specific Embodiment 3

In an MTC system, it is assumed that a PO corresponds to two groups of terminals, that is, the PO corresponds to two group WUSs, i.e., a group WUS1 and a group WUS2, and both the group WUS1 and the group WUS2 need to be transmitted. A corresponding interval g relative to the PO and an offset a relative to the size of a PDCCH search space are configured by signaling. Initial resource block indexes of the group WUS1 and the group WUS2 in a narrowband are configured as 0 and 2 by signalling, respectively.

During transmission, a corresponding sequence is:

$$w_k(m) = \theta n_f, n_s(m') * e^{-\frac{j\pi un(n+1)}{131}}$$

$$m = 0, 1, \ldots, 132M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$k = 1, 2$$

In the above formulas, $M_k$ is a subframe required for transmitting the group WUS, $c_{n_f,n_s}(i)$, $i=0, 1, \ldots, 2*32M_k-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Other forms of sequences are not excluded.

During transmission, corresponding time domain locations are determined in the following manner: end positions of search spaces of both the group WUSs are determined according to g, lengths and start positions of the search spaces of both the group WUSs are determined according to a*Rmax, and $w_i(n)$ is transmitted in the determined search space.

During transmission, corresponding frequency domain locations are determined in the following manner: a sequence $w_1(m)$ corresponding to the group WUS1 is mapped onto resource block indexes 0 and 1 within the narrowband, and a sequence $w_2(m)$ corresponding to the group WUS2 is mapped onto resource block indexes 2 and 3 within the narrowband.

Specific Embodiment 4

In an NB-IoT system, it is assumed that a PO corresponds to two groups of terminals, that is, the PO corresponds to two group WUSs, i.e., a group WUS1 and a group WUS2, and both the group WUS1 and the group WUS2 need to be transmitted. Intervals g1 and g2 and offsets a1 and a2 are configured by signalling.

During transmission, a corresponding sequence is:

$$w_k(m) = \theta n_f, n_s(m') * e^{-\frac{j\pi un(n+1)}{131}}$$

$$m = 0, 1, \ldots, 132M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$k = 1, 2$$

In the above formulas, $M_k$ is a subframe required for transmitting the group WUS, $c_{n_f,n_s}(i)$, $i=0, 1, \ldots, 2*32M_k-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Other forms of sequences are not excluded.

During transmission, corresponding time domain locations are determined in the following manner: an end position of a search space of the group WUS1 is determined according to g1, the length and start position of the search space of the group WUS1 are determined according to a1**Rmax, and $w_1(m)$ is transmitted in the determined search space; and an end position of a search space of the group WUS2 is determined according to g2, the length and start position of the search space of the group WUS2 are determined according to a2*Rmax, and a sequence $w_2(m)$ is transmitted in the determined search space.

Specific Embodiment 5

In an NB-IoT system, it is assumed that a PO corresponds to two groups of terminals, that is, the PO corresponds to two group WUSs, i.e. a group WUS1 and a group WUS2, and both the group WUS1 and the group WUS2 need to be transmitted. Interval g and offsets a1 and a2 are configured by signalling.

During transmission, a corresponding sequence is:

$$w_k(m) = \frac{1 - 2c(2m')}{\sqrt{2}} + j\frac{1 - 2c(2m' + 1)}{\sqrt{2}}$$

$$m = 0, 1, \ldots, 131$$

$$m' = m + 132x$$

$$k = 1, 2$$

In the above formulas, $c(i)$, $i=0, 1, \ldots, 2*32M_k-1$ is a PN sequence, and an initial value is $$c_{init\_WUS} = (h)*2^{29} +$$
$$(N_{ID}^{Cell} + 1)\left(\left(10n_{f\_start\_PO} + \left\lfloor\frac{n_{s\_start\_PO}}{2}\right\rfloor\right)\mod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, and $N_{ID}^{Cell}$ is a cell index. The value of h=1, which is a fixed value. Other forms of sequences are not excluded.

During transmission, corresponding time domain locations are determined in the following manner: end positions of search spaces of both the group WUSs are determined according to g; the length of the search space of the group WUS1 is determined according to a1*Rmax; the length of the search space of the group WUS2 is determined according to a2*Rmax; and start positions of the search spaces of both the group WUSs are determined according to the lengths of the search spaces of the group WUS1 and the group WUS2. Corresponding $w_k(m)$ is transmitted within a corresponding search space in a sequence of firstly the search space of the group WUS1 and subsequently the search space of the group WUS2.

Specific Embodiment 6

In an NB-IoT system, it is assumed that a PO corresponds to two groups of terminals, that is, the PO corresponds to two group WUSs, i.e., a group WUS1 and a group WUS2, and both the group WUS1 and the group WUS2 need to be transmitted. The interval g and offset a are configured by signalling.

During transmission, a corresponding sequence is:

$$w_k(m) = \theta_{n_f, n_s}(m') * e^{-\frac{j\pi un(n+1)}{131}}$$

$$m = 0, 1, \ldots, 132M_k - 1$$

$$n = m \mod 132$$

$$\theta_{n_f, n_s}(m) = \begin{cases} 1, & \text{if } c_{n_f, n_s}(2m) = 0 \text{ and } c_{n_f, n_s}(2m+1) = 0 \\ -1, & \text{if } c_{n_f, n_s}(2m) = 0 \text{ and } c_{n_f, n_s}(2m+1) = 1 \\ j, & \text{if } c_{n_f, n_s}(2m) = 0 \text{ and } c_{n_f, n_s}(2m+1) = 0 \\ -j, & \text{if } c_{n_f, n_s}(2m) = 1 \text{ and } c_{n_f, n_s}(2m+1) = 1 \end{cases}$$

$$k = 1, 2$$

In the above formulas, $M_k$ is a subframe required for transmitting the group WUS, $c_{n_f, n_s}(i)$, $i=0, 1, \ldots, 2*32M_k-1$ is a PN sequence, and an initial value is $$c_{init\_WUS} =$$
$$(N_{ID}^{Cell} + 1)\left(\left(10n_{f\_start\_PO} + \left\lfloor\frac{n_{s\_start\_PO}}{2}\right\rfloor\right)\mod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \mod 126)+3$, and $N_{ID}^{Cell}$ is a cell index. Other forms of sequences are not excluded.

During transmission, corresponding time domain locations are determined in the following manner: end positions of search spaces of both the group WUSs are determined according to g, the lengths of the search spaces of both the group WUSs are determined according to a*Rmax. $w_1(m)$ corresponding to the group WUS1 is mapped backwards from the start of the search space, and $w_2(m)$ corresponding to the group WUS2 is mapped forwards from the end of the search space.

Specific Embodiment 7

In an NB-IoT system, it is assumed that a PO corresponds to two groups of terminals, that is, the PO corresponds to two group WUSs, i.e., a group WUS1 and a group WUS2, and both the group WUS1 and the group WUS2 need to be transmitted. The interval g and offset a are configured by signalling.

During transmission, a corresponding sequence is:

$$w_k(m) = \theta_{n_f, n_s}(m) * e^{-\frac{j\pi un(n+1)}{131}}$$

$$m = 0, 1, \ldots, 132M_k - 1$$

$$n = m \mod 132$$

$$\theta_{n_f, n_s}(m) = \begin{cases} 1, & \text{if } c_{n_f, n_s}(2m) = 0 \text{ and } c_{n_f, n_s}(2m+1) = 0 \\ -1, & \text{if } c_{n_f, n_s}(2m) = 0 \text{ and } c_{n_f, n_s}(2m+1) = 1 \\ j, & \text{if } c_{n_f, n_s}(2m) = 0 \text{ and } c_{n_f, n_s}(2m+1) = 0 \\ -j, & \text{if } c_{n_f, n_s}(2m) = 1 \text{ and } c_{n_f, n_s}(2m+1) = 1 \end{cases}$$

In the above formulas, $M_k$ is a subframe required for transmitting the group WUS, $c_{n_f, n_s}(i)$, $i=0, 1, \ldots, 2*32M_k-1$ is a PN sequence, and an initial value is $$c_{init\_WUS} =$$
$$(N_{ID}^{Cell} + 1)\left(\left(10n_{f\_start\_PO} + \left\lfloor\frac{n_{s\_start\_PO}}{2}\right\rfloor\right)\mod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \mod 126)+3$, and $N_{ID}^{Cell}$ is a cell index. Other forms of sequences are not excluded.

During transmission, corresponding time domain locations are determined in the following manner: end positions of search spaces of both the group WUSs are determined according to g, the lengths of search spaces of both the group WUSs are determined according to a*Rmax, and the position within the search space implicitly is determined according to the group index of the group WUS. For example, $w_1(m)$ corresponding to the group WUS1 is mapped from the start of the search space, and $w_2(m)$ corresponding to the group WUS2 is mapped from the middle of the search space.

Specific Embodiment 8

In an NB-IoT system, it is assumed that a PO corresponds to two groups of terminals, that is, the PO corresponds to two group WUSs, i.e., a group WUS1 and a group WUS2, and both the group WUS1 and the group WUS2 need to be transmitted. The interval g and offset a are configured by signalling.

During transmission, a corresponding sequence is:

$$w_k(m) = \theta n_f, n_s(m) * e^{-\frac{j\pi un(n+1)}{131}}$$

$$m = 0, 1, \ldots, 132 M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

In the above formulas, $M_k$ is a subframe required for transmitting the group WUS, $c_{n_f,n_s}(i)$, $i=0, 1, \ldots, 2*32M_k-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Other forms of sequences are not excluded.

During transmission, corresponding time domain locations are determined in the following manner: end positions of search spaces of both the group WUSs are determined according to g, the lengths of the search spaces of both the group WUSs are determined according to a*Rmax, and the position within the search space implicitly is determined according to the group index of the group WUS. For example, $w_1(m)$ corresponding to the group WUS1 is mapped from the start of the search space, the end position being the middle of the search space, and $w_2(m)$ corresponding to the group WUS2 is mapped from the middle of the search space, the end position being the end of the search space.

Specific Embodiment 9

It is assumed that a PO corresponds to two groups of terminals, that is, the PO corresponds to two group WUSs, i.e., a group WUS1 and a group WUS2, and both the group WUS1 and the group WUS2 need to be transmitted. When Rmax is greater than or equal to a threshold value, the group WUSs are transmitted according to Specific Embodiment 1 (or Specific Embodiment 2); otherwise the group WUSs are transmitted according to Specific Embodiment 4 (or Specific Embodiment 5, or Specific Embodiment 6, or Specific Embodiment 7, or Specific Embodiment 8), wherein the threshold value is preset.

Specific Embodiment 10

It is assumed that a PO corresponds to two groups of terminals, that is, the PO corresponds to two group WUSs, i.e., a group WUS1 and a group WUS2, and both the group WUS1 and the group WUS2 need to be transmitted. When a*Rmax is greater than or equal to a threshold value, the group WUSs are transmitted according to Specific Embodiment 1 (or Specific Embodiment 2); otherwise, the group WUSs are transmitted according to Specific Embodiment 4 (or Specific Embodiment 5, or Specific Embodiment 6, or Specific Embodiment 7, or Specific Embodiment 8); wherein the threshold value is preset.

Specific Embodiment 11

It is assumed that a PO corresponds to two groups of terminals, that is, the PO corresponds to two group WUSs, i.e., a group WUS1 and a group WUS2, and both the group WUS1 and the group WUS2 need to be transmitted. When the number of the group WUSs required to be transmitted/configuration groups of the group WUSs required to be transmitted is greater than or equal to a fixed value, e.g., 3, then the group WUSs are transmitted according to Specific Embodiment 1 (or Specific Embodiment 2); otherwise, the group WUSs are transmitted according to Specific Embodiment 3.

Specific Embodiment 12

It is assumed that a PO corresponds to two groups of terminals, that is, the PO corresponds to two group WUSs, i.e., a group WUS1 and a group WUS2, and both the group WUS1 and the group WUS2 need to be transmitted. When the number of the group WUSs required to be transmitted/configuration groups of the group WUSs required to be transmitted is greater than or equal to a preset value/a value configured by signalling, then the group WUSs are transmitted according to Specific Embodiment 1 or Specific Embodiment 2; otherwise, the group WUSs are transmitted according to Specific Embodiment 3.

Specific Embodiment 13

It is assumed that a PO corresponds to two groups of terminals, that is, the PO corresponds to two group WUSs, i.e., a group WUS1 and a group WUS2, and both the group WUS1 and the group WUS2 need to be transmitted. When the terminal type of N terminals among the terminals corresponding to the PO is coverage enhancement, N being an integer greater than or equal to 1, then the group WUSs are transmitted according to Specific Embodiment 1 (or Specific Embodiment 2); otherwise, the group WUSs are transmitted according to Specific Embodiment 4 (or Specific Embodiment 5, or Specific Embodiment 6, or Specific Embodiment 7, or Specific Embodiment 8).

Specific Embodiment 14

It is assumed that a PO corresponds to two groups of terminals, that is, the PO corresponds to two group WUSs, i.e., a group WUS1 and a group WUS2, and both the group WUS1 and the group WUS2 need to be transmitted. When the terminal configuration of M terminals among the terminals corresponding to the PO is coverage enhancement mode B, M being an integer greater than or equal to 1, then the group WUSs are transmitted according to Specific Embodiment 1 (or Specific Embodiment 2); otherwise, the group WUSs are transmitted according to Specific Embodiment 4 (or Specific Embodiment 5, or Specific Embodiment 6, or Specific Embodiment 7, or Specific Embodiment 8).

Specific Embodiment 15

In an MTC system, it is assumed that a PO corresponds to four groups of terminals, that is, the PO corresponds to four group WUSs, i.e., a group WUS1, a group WUS2, a group WUS3 and a group WUS4, all of which need to be transmitted. The interval g and offset a are configured by signalling. It is assumed that B=33. It is assumed that a base station configures that initial resource block indexes of the group WUS1 and the group WUS2 in the narrowband are 0, and that initial resource block indexes of the group WUS3 and the group WUS4 in the narrowband are 2.

During transmission, a sequence corresponding to the group WUS1 is:

$$w_1(m) = \theta n_f, n_s(m) * e^{-\frac{j\pi un(n+1)}{131}} * e^{-2\pi n\eta}$$

$$m = 0, 1, \ldots, 132M_1 - 1$$

$$n = m \bmod 132$$

$$\eta = \frac{33}{132}$$

During transmission, a sequence corresponding to the group WUS2 is:

$$w_2(m) = \theta n_f, n_s(m) * e^{-\frac{j\pi un(n+1)}{131}} * e^{-2\pi n\eta}$$

$$m = 0, 1, \ldots, 132M_2 - 1$$

$$n = m \bmod 132$$

$$\eta = \frac{33}{132} * 2$$

During transmission, a sequence corresponding to the group WUS3 is:

$$w_3(m) = \theta n_f, n_s(m) * e^{-\frac{j\pi un(n+1)}{131}} * e^{-2\pi n\eta}$$

$$m = 0, 1, \ldots, 132M_3 - 1$$

$$n = m \bmod 132$$

$$\eta = \frac{33}{132}$$

During transmission, a sequence corresponding to the group WUS4 is:

$$w_4(m) = \theta n_f, n_s(m) * e^{-\frac{j\pi un(n+1)}{131}} * e^{-2\pi n\eta}$$

$$m = 0, 1, \ldots, 132M_4 - 1$$

$$n = m \bmod 132$$

$$\eta = \frac{33}{132} * 2$$

In the above formulas, $$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

wherein $M_i$ is a subframe required for transmitting the group WUS, $c_{n_f,n_s}(i)$, i=0, 1, . . . , 2*132$M_i$−1 is a PN sequence, and an initial value is $$c_{init\_WUS} = (N_{ID}^{Cell} + 1)\left(\left(10 n_{f\_start\_PO} + \left\lfloor\frac{n_{s\_start\_PO}}{2}\right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ED}^{Cell}$ is a cell index. Other sequence generation methods are not excluded.

During transmission, corresponding time domain locations are determined in the following manner: end positions of search spaces of all the group WUSs are determined according to g, and the lengths of the search spaces of all the group WUSs are determined according to a*Rmax. The sequences corresponding to the group WUSs are mapped from the starts of the search spaces.

During transmission, corresponding frequency domain locations are determined in the following manner: a sequence $w_1(m)$ corresponding to the group WUS1 and a sequence $w_2(m)$ corresponding to the group WUS2 are mapped onto resource block indexes 0 and 1 within the narrowband; and a sequence $w_3(m)$ corresponding to the group WUS3 and a sequence $w_4(m)$ corresponding to the group WUS4 are mapped onto resource block indexes 2 and 3 within the narrowband.

Specific Embodiment 16

In an MTC system, it is assumed that a PO corresponds to four groups of terminals, that is, the PO corresponds to four group WUSs, i.e., a group WUS1, a group WUS2, a group WUS3 and a group WUS4, all of which need to be transmitted. The interval g and offset a are configured by signalling. It is assumed that B=33.

During transmission, a sequence corresponding to the group WUS1 is:

$$w_1(m) = \theta_{n_f, n_s}(m) * e^{-\frac{j\pi un(n+1)}{131}} * e^{-2\pi n\eta}$$

$$m = 0, 1, \ldots, 132M_1 - 1$$

$$n = m \bmod 132$$

$$\eta = \frac{33}{132}$$

During transmission, a sequence corresponding to the group WUS2 is:

$$w_2(m) = \theta_{n_f, n_s}(m) * e^{-\frac{j\pi un(n+1)}{131}} * e^{-2\pi n\eta}$$

$$m = 0, 1, \ldots, 132M_2 - 1$$

$$n = m \bmod 132$$

$$\eta = \frac{33}{132} * 2$$

During transmission, a sequence corresponding to the group WUS3 is:

$$w_3(m) = \theta_{n_f, n_s}(m) * e^{-\frac{j\pi un(n+1)}{131}} * e^{-2\pi n\eta}$$

$$m = 0, 1, \ldots, 132M_3 - 1$$

$$n = m \bmod 132$$

$$\eta = \frac{33}{132}$$

During transmission, a sequence corresponding to the group WUS4 is:

$$w_4(m) = \theta_{n_f, n_s}(m) * e^{-\frac{j\pi un(n+1)}{131}} * e^{-2\pi n\eta}$$

$$m = 0, 1, \ldots, 132M_4 - 1$$

$$n = m \bmod 132$$

$$\eta = \frac{33}{132} * 2$$

In the above formulas, $$\theta_{n_f, n_s}(m) = \begin{cases} 1, & \text{if } c_{n_f, n_s}(2m) = 0 \text{ and } c_{n_f, n_s}(2m+1) = 0 \\ -1, & \text{if } c_{n_f, n_s}(2m) = 0 \text{ and } c_{n_f, n_s}(2m+1) = 1 \\ j, & \text{if } c_{n_f, n_s}(2m) = 0 \text{ and } c_{n_f, n_s}(2m+1) = 0 \\ -j, & \text{if } c_{n_f, n_s}(2m) = 1 \text{ and } c_{n_f, n_s}(2m+1) = 1 \end{cases}$$

wherein $M_k$ is a subframe required for transmitting the group WUS, $c_{n_f, n_s}(i)$, i=0, 1, . . . , 2*132$M_i$−1 is a PN sequence, and an initial value is $$c_{init\_WUS} = (N_{ID}^{Cell} + 1)\left(\left(10n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, u=($N_{ID}^{NCell}$ mod 126)+3, and $N_{ID}^{Cell}$ is a cell index.

During transmission, corresponding time domain locations are determined in the following manner: end positions of search spaces of all the group WUSs are determined according to g, and the lengths of the search spaces of all the group WUSs are determined according to a*Rmax. A sequence of the group with ceil(group index/2)=1 is mapped from the start of the search space, that is, sequences corresponding to the group WUS1 and the group WUS2 are mapped from the starts of the search spaces; and a sequence of the group with ceil(group index/2)=2 is mapped from the middle of the search space, that is, sequences corresponding to the group WUS3 and the group WUS4 are mapped from the middles of the search spaces. Or start positions of the group WUSs in the search space are configured by signalling.

Specific Embodiment 17

In an NB-IoT system, it is assumed that a PO corresponds to four groups of terminals, that is, the PO corresponds to four group WUSs, i.e., a group WUS1, a group WUS2, a group WUS3 and a group WUS4, all of which need to be transmitted. The interval g and offset a are configured by signalling. It is assumed that B=33.

During transmission, if the actual time domain length of any one group WUS among the group WUS1, the group WUS2, the group WUS3 and the group WUS4 required to be transmitted exceeds a threshold value k, then a sequence corresponding to the group WUS1 transmitted is:

$$w_1(m) = \theta_{n_f, n_s}(m) * e^{-\frac{j\pi un(n+1)}{131}} * e^{-2\pi n\eta}$$

$$m = 0, 1, \ldots, 132M_1 - 1$$

$$n = m \bmod 132$$

$$\eta = \frac{33}{132}$$

During transmission, a sequence corresponding to the group WUS2 is:

$$w_2(m) = \theta_{n_f, n_s}(m) * e^{-\frac{j\pi un(n+1)}{131}} * e^{-2\pi n\eta}$$

$$m = 0, 1, \ldots, 132M_2 - 1$$

$$n = m \bmod 132$$

$$\eta = \frac{33}{132} * 2$$

During transmission, a sequence corresponding to the group WUS3 is:

$$w_3(m) = \theta n_f, n_s(m) * e^{-\frac{j\pi un(n+1)}{131}} * e^{-2\pi n\eta}$$

$$m = 0, 1, \ldots, 132M_3 - 1$$

$$n = m \bmod 132$$

$$\eta = \frac{33}{132} * 3$$

During transmission, a sequence corresponding to the group WUS4 is:

$$w_4(m) = \theta n_f, n_s(m) * e^{-\frac{j\pi un(n+1)}{131}} * e^{-2\pi n\eta}$$

$$m = 0, 1, \ldots, 132M_4 - 1$$

$$n = m \bmod 132$$

$$\eta = \frac{33}{132} * 4$$

In the above formulas, $$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

wherein $M_k$ is a subframe required for transmitting the group WUS, $c_{n_f,n_s}(i)$, i=0, 1, ..., $2*132M_i-1$ is a PN sequence, and an initial value is $$c_{init\_WUS} = (N_{ID}^{Cell} + 1)\left(\left(10n_{f\_start\_PO} + \left\lfloor\frac{n_{s\_start\_PO}}{2}\right\rfloor\right)\bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, u=($N_{ID}^{Ncell}$ mod 126)+3, and $N_{ID}^{Cell}$ is a cell index.

During transmission, corresponding time domain locations are determined in the following manner: end positions of search spaces of all the group WUSs are determined according to g, and the lengths of the search spaces of all the group WUSs are determined according to a*Rmax, thereby obtaining start positions of the search spaces of the group WUSs, and $w_1, w_2, w_3, w_4$ being mapped from the starts of the search spaces.

During transmission, if none of actual time domain lengths of the group WUS1, the group WUS2, the group WUS3 and the group WUS4 required to be transmitted exceeds a threshold value k, then all sequences corresponding to the transmitted group WUS1, group WUS2, group WUS3 and group WUS4 are:

$$w_k(m) = \theta n_f, n_s(m) * e^{-\frac{j\pi un(n+1)}{131}}$$

$$m = 0, 1, \ldots, 132M_k - 1$$

$$n = m \bmod 132$$

wherein $$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

wherein $M_k$ is a subframe required for transmitting the group WUS, $c_{n_f,n_s}(i)$, i=0, 1, ..., $2*132M_i-1$ is a PN sequence, and an initial value is $$c_{init\_WUS} = (N_{ID}^{Cell} + 1)\left(\left(10n_{f\_start\_PO} + \left\lfloor\frac{n_{s\_start\_PO}}{2}\right\rfloor\right)\bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, u=($N_{ID}^{Ncell}$ mod 126)+3, and $N_{ID}^{Cell}$ is a cell index. Other forms of sequences are not excluded.

During transmission, corresponding time domain locations are determined in the following manner: end positions of search spaces of all the group WUSs are determined according to g, and the lengths of the search spaces of all the group WUSs are determined according to a*Rmax, thereby obtaining start positions of the search spaces of the group WUSs. The four group WUSs are mapped to different positions within the search spaces, for example, the group WUS1 is mapped between the start of the search space and ¼ of the search space, and the group WUS4 is mapped between ¾ of the search space and the end of the search space. The specific positions may also be indicated according to signalling, and in this case, it is equivalent to that the intervals of the group WUSs relative to the PO are different.

Specific Embodiment 18

In an MTC system, it is assumed that a PO corresponds to four groups of terminals, that is, the PO corresponds to four group WUSs, i.e., a group WUS1, a group WUS2, a group WUS3 and a group WUS4, all of which need to be transmitted. The interval g and offset a are configured by signalling. It is assumed that B=33. It is assumed that a base station configures that initial resource block indexes of the group WUS1 and the group WUS2 in a narrowband are 0, and initial resource block indexes of the group WUS3 and the group WUS4 in the narrowband are 2.

During transmission, a corresponding sequence is:

$$w_k(m) = \theta n_f, n_s(m) * e^{-\frac{j\pi un(n+1)}{131}}$$

$$m = 0, 1, \ldots, 132M_k - 1$$

$$n = m \bmod 132$$

-continued $$\theta_{n_f, n_s}(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$k = 1, 2, 3, 4$$

wherein $M_k$ is a subframe required for transmitting the group WUS, $c_{n_f,n_s}(i)$, $i=0, 1, \ldots, 2*32M_k-1$ is a PN sequence, and an initial value is $$c_{init\_WUS} = (N_{ID}^{Cell} + 1)\left(\left(10n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index.

During transmission, corresponding time domain locations are determined in the following manner: end positions of search spaces of all the group WUSs are determined according to g, and the lengths of the search spaces of all the group WUSs are determined according to a*Rmax. A sequence of the group with mod(group index, 2)=1 is mapped from the start of the search space, that is, the sequences corresponding to the group WUS1 and the group WUS3 are mapped from the starts of the search spaces. A sequence of the group with mod(group index, 2)=0 is mapped from the middle of the search space, that is, the sequences corresponding to the group WUS2 and the group WUS4 are mapped from the middles of the search spaces. The positions may also be configured by signalling.

During transmission, corresponding frequency domain locations are determined in the following manner: a sequence $w_1(m)$ corresponding to the group WUS1 and a sequence $w_2(m)$ corresponding to the group WUS2 are mapped onto resource block indexes 0 and 1 in the narrowband; and a sequence $w_3(m)$ corresponding to the group WUS3 and a sequence $w_4(m)$ corresponding to the group WUS4 are mapped onto resource block indexes 2 and 3 in the narrowband.

Exemplary Embodiment 5

Specific Embodiment 1

For an MTC system, it is assumed that a second terminal index of a terminal is obtained by calculating IMSI mod 16384, wherein IMSI is short for International Mobile Subscriber Identity, and the value range of the IMSI is 0 to 9999999999. It is assumed that the value of the second terminal index is 1504, and it is assumed that the first terminal index of the terminal is determined according to the second terminal index.

The first terminal index UE_ID of the terminal for determining a group index of a group WUS is 1504.

Specific Embodiment 2

It is assumed that a first terminal index of a terminal is determined according to a second terminal index, a DRX cycle index, and an index of a cell where the terminal is located.

The first terminal index of the terminal for determining a group index of a group WUS is:

$$UE\_ID = \sum_{i=0}^{X-1} c(i) * 2^i.$$

The value of X is related to the value range of the second terminal index, for example, in an MTC system, the maximum value of the second terminal index is 16384, then the value of X is 14; and in an NB-IoT system, the maximum value of the second terminal index is 4096, then the value of X is 12. In the above formula, c(n) is a PN sequence, and an initial value is related to the second terminal index, the DRX cycle index and the index of the cell where the terminal is located. For example, $C_{initial}=(UE\_ID\_1+1)(N_{ID}^{DRX}+1)*2^9+N_{ID}^{Cell}$, wherein $N_{ID}^{DRX}$ is the DRX cycle index.

Specific Embodiment 3

It is assumed that a first terminal index of a terminal is determined according to a second terminal index, a DRX cycle period, a radio frame index, and an index of a cell where the terminal is located.

The first terminal index of the terminal for determining a group index of a group WUS is:

$$UE\_ID = \mod\left(\sum_{i=0}^{X-1} c(i) * 2^i, Y\right),$$

wherein the value of X is a fixed value; the value of Y in an MTC system is 16384, and the value of Y in an NB-IoT system is 4096. In the above formula, c(n) is a PN sequence, and an initial value is related to the second terminal index, the DRX cycle period, the radio frame index and the index of the cell where the terminal is located. For example, $$C_{initial} = (UE\_ID\_1 + 1)\left(\frac{10n_f}{T^{DRX}} + 1\right) * 2^9 + N_{ID}^{Cell},$$

wherein $n_f$ is the radio frame index, and $T^{DRX}$ is the DRX cycle period.

Specific Embodiment 4

It is assumed that a first terminal index of a terminal is determined according to a second terminal index, a DRX cycle index, and an index of a cell where the terminal is located.

The first terminal index of the terminal for determining a group index of a group WUS is:

$$UE\_ID = \mod\left(\sum_{i=0}^{X-1} c(i) * 2^i, Y\right),$$

wherein the value of X is a fixed value, the value of Y in an MTC system is 16384, and the value of Y in an NB-IoT system is 4096. In the above formula, c(n) is a PN sequence, and an initial value is related to the second terminal index, the DRX cycle index and the index of the cell where the terminal is located. For example, $C_{initial}=(UE\_ID\_1+1)(N_{ID}^{DRX}+1)*2^9+N_{ID}^{Cell}$, wherein the DRX cycle index is determined according to the radio frame index and the DRX cycle period. For example, it is assumed that the DRX cycle period is 512, then the DRX cycle index corresponding to the radio frame indexes 0 to 511 is 0, the DRX cycle index corresponding to the radio frame indexes 512 to 1023 is 1, and so on.

Specific Embodiment 5

It is assumed that a first terminal index of a terminal is determined according to a second terminal index, a DRX cycle index, and an index of a cell where the terminal is located.

The first terminal index of the terminal for determining a group index of a group WUS is:

$$UE\_ID = \sum_{i=0}^{X-1} c(N_{ID}^{DRX} + i + UE\_ID\_1) * 2^i,$$

wherein the value of X is a fixed value, and UE_ID_1 is the second terminal index. In the above formula, c(n) is a PN sequence, and an initial value is determined according to the index of the cell where the terminal is located, for example, $C_{initial}=N_{ID}^{Cell}$. The terminal determines the DRX cycle index $N_{ID}^{DRX}$ according to a radio frame index and a DRX cycle period. For example, if the DRX cycle period is 512, then the DRX cycle index corresponding to the radio frame indexes 0 to 511 is 0, the DRX cycle index corresponding to the radio frame indexes 512 to 1023 is 1, and so on.

Specific Embodiment 6

It is assumed that a first terminal index of a terminal is determined according to a second terminal index, a DRX cycle index, and an index of a cell where the terminal is located.

The first terminal index of the terminal for determining a group index of a group WUS is:

$$UE\_ID = \sum_{i=0}^{X-1} c(N_{ID}^{DRX} + i + UE\_ID\_1) * 2^i,$$

wherein value of X is a fixed value, and UE_ID_1 is the second terminal index. In the formula, c(n) is a PN sequence, and an initial value is determined according to the index of the cell where the terminal is located and the DRX cycle index, for example, $C_{initial}=(N_{ID}^{DRX}+1)*2^9+N_{ID}^{Cell}$. The terminal determines the DRX cycle index according to a radio frame index and a DRX cycle period. For example, if the DRX cycle period is 512, the DRX cycle index corresponding to the radio frame indexes 0 to 511 is 0, the DRX cycle index corresponding to the radio frame indexes 512 to 1023 is 1, and so on.

Specific Embodiment 7

A terminal obtains a corresponding group index of a group WUS according to a modulus result of (first terminal index) mod (the number of groups).

Exemplary Embodiment 6

Specific Embodiment 1

It is assumed that a group index of a group WUS corresponding to a terminal A is k.

The terminal A receives a group Wake up signal transmitted by a base station to the terminal, and the terminal detects the corresponding group Wake up signal. During detection of the terminal A, a sequence used is:

$$w_k(m) = \theta n_f, n_s(m) * e^{-\frac{j\pi un(n+1)}{131}} * e^{-2\pi m\eta}$$

$$m = 0, 1, \ldots, 132M - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$\eta = \frac{B}{132}(k+h)$$

wherein M is a subframe on which the WUS is transmitted, $c_{n_f,n_s}(i)$, i=0, 1, ..., 2.132M−1 is a PN sequence, and an initial value is $$c_{init\_WUS} = (N_{ID}^{Cell}+1)\left(\left(10n_{f\_start\_PO} + \left\lfloor\frac{n_{s\_start\_PO}}{2}\right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. B is a preset value, and B=66. If the group index k is numbered from 0, h=1. If the group index k is numbered from 1, h=0.

Specific Embodiment 2

It is assumed that a group index of a group WUS corresponding to a terminal A is k. The terminal A receives a group Wake up signal transmitted by a base station to the terminal, and the terminal A detects the corresponding group Wake up signal. When the terminal performs detection, a sequence used is:

$$w(m) = \theta n_f, n_s(m) * e^{-\frac{j\pi un(n+1)}{131}}$$

$$m = 0, 1, \ldots, 132M - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

wherein M is subframe on which the WUS is transmitted, $c_{n_f,n_s}(i)$, i=0, 1, ..., 2·132M−1 is a PN sequence, and an initial value is $$c_{init\_WUS} = (k+h)*2^{29} + (N_{ID}^{Cell}+1)\left(\left(10n_{f\_start\_PO} + \left\lfloor\frac{n_{s\_start\_PO}}{2}\right\rfloor\right)\bmod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. B is a preset value, or the specific value of B is related to the number of groups. If the group index k is numbered from 0, h=1. If the group index k is numbered from 1, h=0.

Specific Embodiment 3

It is assumed that a group index of a group WUS corresponding to a terminal A is k. The terminal A receives a group Wake up signal transmitted by a base station to the terminal, and the terminal A detects the corresponding group Wake up signal. When the terminal performs detection, a sequence used by a subframe x (x=0, 1, ..., $M_k$−1) is.

$$w_k(m) = \theta_{n_f,n_s}(m') * e^{-\frac{j\pi u n(n+1)}{131}} * e^{-2\pi n\eta}$$

$$m = 0, 1, \ldots, 131$$

$$m' = m + 132x$$

$$n = m \bmod 132$$

$$\theta_{n_f,n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 0 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

$$\eta = \frac{B}{132}((k+h))$$

wherein $M_k$ is a subframe required for transmitting the group WUS, $c_{n_f,n_s}(i)$, i=0, 1, ..., 2*32$M_k$−1 is a PN sequence, and an initial value is $$c_{init\_WUS} = (N_{ID}^{Cell}+1)\left(\left(10n_{f\_start\_PO} + \left\lfloor\frac{n_{s\_start\_PO}}{2}\right\rfloor\right)\bmod 2048 + 1\right)*2^9 + N_{ID}^{Cell},$$

wherein $n_{s\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. B is a preset value. If the group index k is numbered from 0, h=1. If the group index k is numbered from 1, h=0.

Specific Embodiment 4

It is assumed that a group index of a group WUS corresponding to a terminal A is k. The terminal A receives a group Wake up signal transmitted by a base station to the terminal, and the terminal A detects the corresponding group Wake up signal. When the terminal performs detection, a sequence used by a subframe x (x=0, 1, ..., $M_k$−1) is:

$$w_k(m) = \theta_{n_f,n_s}(m') * e^{-\frac{j\pi u n(n+1)}{131}}$$

$$m = 0, 1, \ldots, 131$$

$$m' = m + 132x$$

$$n = m \bmod 132$$

$$\theta_{n_f,n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 0 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

wherein $M_k$ is a subframe required for transmitting the group WUS, $c_{n_f,n_s}(i)$, i=0, 1, ..., 2*32$M_k$−1 is a PN sequence, and an initial value is $$c_{init\_WUS} = (k+h)*2^{29} + (N_{ID}^{Cell}+1)\left(\left(10n_{f\_start\_PO} + \left\lfloor\frac{n_{s\_start\_PO}}{2}\right\rfloor\right)\bmod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. B is a preset value, and B=66. If the group index k is numbered from 0, h=1. If the group index k is numbered from 1, h=0.

Specific Embodiment 5

It is assumed that a group index of a group WUS corresponding to a terminal A is k. The terminal A receives a group Wake up signal transmitted by a base station to the terminal, and the terminal A detects the corresponding group Wake up signal. When the terminal performs detection, a sequence used by a subframe x (x=0, 1, ..., $M_k$−1) is.

$$w_k(m) = \frac{1-2c(2m')}{\sqrt{2}} + j\frac{1-2c(2m'+1)}{\sqrt{2}}$$

$$m = 0, 1, \ldots, 131$$

$$m' = m + 132x$$

c (i), i=0, 1, ..., 2*32$M_k$−1 is a PN sequence, and an initial value is $$c_{init\_WUS} = (k+h)*2^{29} + (N_{ID}^{Cell}+1)\left(\left(10n_{f\_start\_PO} + \left\lfloor\frac{n_{s\_start\_PO}}{2}\right\rfloor\right)\bmod 2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, and $N_{ID}^{Cell}$ is a cell index. If the group index k is numbered from 0, h=1. If the group index k is numbered from 1, h=0.

Specific Embodiment 6

It is assumed that a group index of a group WUS corresponding to a terminal A is k. The terminal A receives a group Wake up signal transmitted by a base station to the terminal, and the terminal A detects the corresponding group Wake up signal. When the terminal performs detection, a sequence used by a subframe x (x=0, 1, . . . , $M_k$-1) is.

$$w_k(m) = \theta n_f, n_s(m') * e^{-\frac{j\pi u n(n+1)}{131}} * \theta_k(m')$$

$$m = 0, 1, \ldots, 131$$

$$m' = m + 132x$$

$$n = m \bmod 132$$

$$\theta n_f, n_s(m') = \begin{cases} 1, & \text{if } c_{n_f,n_s}(2m') = 0 \text{ and } c_{n_f,n_s}(2m' + 1) = 0 \\ -1, & \text{if } c_{n_f,n_s}(2m') = 0 \text{ and } c_{n_f,n_s}(2m' + 1) = 1 \\ j, & \text{if } c_{n_f,n_s}(2m') = 0 \text{ and } c_{n_f,n_s}(2m' + 1) = 0 \\ -j, & \text{if } c_{n_f,n_s}(2m') = 1 \text{ and } c_{n_f,n_s}(2m' + 1) = 1 \end{cases}$$

wherein $M_k$ is a subframe required for transmitting the group WUS, $c_{n_f,n_s}(i)$, i=0, 1, . . . , $2*32M_k-1$ is a PN sequence, and an initial value is $$c_{init\_WUS} = (N_{ID}^{Cell} + 1)\left(\left(10n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, $N_{ID}^{Cell}$ is a cell index. In the specific embodiment, c (i), i=0, 1, . . . , $2*132M_k-1$ is a PN sequence, and the initial value is at least related to the group index k.

Specific Embodiment 7

In an MTC system, an initial resource block index of a group WUS in a narrowband obtained according to signalling is fixed at 0. It is assumed that a group index of a group WUS corresponding to a terminal A is k, the terminal A receives a group Wake up signal transmitted by a base station to the terminal, and the terminal A detects the corresponding group Wake up signal. When the terminal performs detection, a basic sequence used by a subframe x (x=0, 1, . . . , $M_k$-1) is:

$$w_k(m) = \frac{1 - 2c(2m')}{\sqrt{2}} + j\frac{1 - 2c(2m' + 1)}{\sqrt{2}}$$

m=0, 1, . . . , 131 m'=m+132x c (i), i=0, 1, . . . , $2*32M_k-1$ is a PN sequence, and an initial value is $$c_{init\_WUS} = (k + h) * 2^{29} + (N_{ID}^{Cell} + 1)\left(\left(10n_{f\_start\_PO} + \left\lfloor \frac{n_{s\_start\_PO}}{2} \right\rfloor\right) \bmod 2038 + 1\right) * 2^9 + N_{ID}^{Cell},$$

or $$c_{init\_WUS} = (N_{ID}^{Cell} + 1)\left(\left(10n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, and $N_{ID}^{Cell}$ is a cell index. If the group index k is numbered from 0, h=1. If the group index k is numbered from 1, h=0. or h=1. Other forms of basic sequences are not excluded.

Then, on a subframe x, a corresponding sequence of the group WUS on a resource block 0 is $w_1(0)*w_k(m)$, and a corresponding sequence of the group WUS on a resource block 1 is $w_1(1)*w_k(m)$. The value of w(j) is as shown in the following Table 2:

TABLE 2

| Group index | $w_1(0)$ | $w_1(1)$ |
|---|---|---|
| 1 | 1 | 1 |
| 2 | 1 | -1 |

Specific Embodiment 8

If K group WUSs are distinguished by different frequency domain locations and/or time domain locations, sequences corresponding to the K group WUSs may be the same. That is, in embodiment 1 to embodiment 7, the value of k for determining a sequence is a fixed value.

Exemplary Embodiment 7

Specific Embodiment 1

It is assumed that a group index of a group WUS1 corresponding to an MTC terminal A is 1, and the terminal A receives a group Wake up signal transmitted by a base station to the terminal. An initial resource block index of the group WUS1 with a group index of 1 in a narrowband is indicated as 0 by signalling.

During receiving, the terminal A receives the group WUS1 transmitted by the base station on resource block indexes 0 and 1 of the narrowband, and the terminal detects the received group WUS1.

Specific Embodiment 2

It is assumed that a group index of a group WUS1 corresponding to an MTC terminal A is 1. It is preset that: an initial resource block index of the group WUS1 with a group index of 0 in a narrowband is fixed at 0, an initial resource block index of a group WUS2 with a group index of 2 in the narrowband is fixed at 2, and an initial resource block index of a group WUS3 with a group index of 3 in the narrowband is fixed at 4.

During receiving, the terminal A receives a group Wake up signal transmitted by a base station to the terminal. Since an initial resource block index of the group WUS1 with a group index of 1 in the narrowband is preset as 0, the terminal A receives the group WUS1 transmitted by the base station on resource block indexes 0 and 1 of the narrowband, and the terminal detects the received group WUS1.

Specific Embodiment 3

It is assumed that a group index of a group WUS2 corresponding to an MTC terminal A is 2. The terminal A receives a group Wake up signal transmitted by a base station to the terminal. An initial resource block index of the group WUSs in a narrowband is indicated as 1 by signalling.

During receiving, the terminal A determines a resource block index of the group WUS2 in the narrowband according to the initial resource block index of the group WUSs in the narrowband indicated by signalling and an index of a group to which the terminal A belongs. Since the initial resource block index of the group WUSs in the narrowband is indicated as 1 by signalling (equivalent to indicating that the resource block indexes of the group WUS1 in the narrowband are 1 and 2) and the group index corresponding to the terminal A is 2, the terminal A receives the group WUS2 transmitted by the base station on resource block indexes 3 and 4 in the narrowband, and the terminal detects the received group WUS2.

Exemplary Embodiment 8

Specific Embodiment 1

It is assumed that a terminal A corresponds to a group WUS1 with a group index of 1. A corresponding interval g1 between the group WUS1 and a PO, and an offset a1 of the group WUS1 with respect to the size of a PDCCH search space are indicated by signalling.

During receiving, the terminal A determines an end position of a search space of the group WUS1 according to g1, determines the length of the search space of the group WUS1 according to a1*Rmax, and determines a start position of the search space of the group WUS1 according to the end position and length. The terminal A detects the group WUS1 from the start of the search space of the group WUS1.

Specific Embodiment 2

It is assumed that a terminal A corresponds to a group WUS1 and a terminal B corresponds to a group WUS2. A corresponding interval g relative to a PO and offsets a1 and a2 of the group WUSs with respect to the size of a PDCCH search space (1 offset, N durations) are configured by signalling.

During receiving, the terminal A and the terminal B determine end positions of search spaces of both the group WUSs according to g, determine the length of the search space of the group WUS1 according to a1*Rmax, determine the length of the search space of the group WUS2 according to a2*Rmax, and determine start positions of the search spaces of both the group WUSs according to the lengths of the search spaces of the group WUS1 and the group WUS2.

The terminal A and the terminal B detect the corresponding group WUS1 and group WUS2 in corresponding search spaces according to a preset sequence of the search spaces; or the terminal A and the terminal B detect the corresponding group WUS1 and group WUS2 in corresponding search spaces according to a sequence implicitly determined by corresponding group indexes.

Specific Embodiment 3

It is assumed that a terminal A corresponds to a group WUS1 and a terminal B corresponds to a group WUS2. A corresponding interval g relative to a PO, an offset a with respect to the size of a PDCCH search space (1 offset, 1 duration), and start positions of the group WUSs in the search spaces are configured by signalling. The start position of the group WUS1 in the search space is the start of the search space, and the start position of the group WUS2 in the search space is the end of the search space.

During receiving, the terminal A and the terminal B determine end positions of the search spaces of both the group WUSs according to g, and determine the lengths and start positions of the search spaces of both the group WUSs according to a*Rmax. The terminal A detects the group WUS1 from the start of the search space from front to back according to the start position of the group WUS1 within the search space, and the terminal B detects the group WUS2 from the end of the search space from back to front according to the start position of the group WUS2 within the search space.

Specific Embodiment 4

It is assumed that a terminal A corresponds to a group WUS1 and a terminal B corresponds to a group WUS2. A corresponding interval g relative to a PO and an offset a relative to the size of a PDCCH search space (1 offset, 1 duration) are configured by signalling.

During receiving, the terminal A and the terminal B determine end positions of search spaces of both the group WUSs according to g, determine the lengths and start positions of the search spaces of both the group WUSs according to a*Rmax, and implicitly determine the start positions of the group WUSs according to group indexes of the group WUSs. For example, the start position of the group WUS1 is the start of the search space, and the start position of the group WUS2 is the middle of the search space. The terminal A detects the group WUS1 from the start of the search space, and the terminal B detects the group WUS2 from the middle of the search space.

Specific Embodiment 5

It is assumed that a terminal A corresponds to a group WUS1, and a terminal B corresponds to a group WUS2. A corresponding interval g relative to a PO and an offset a relative to the size of a PDCCH search space (1 offset, 1 duration) are configured by signalling.

During receiving, the terminal A and the terminal B determine end positions of search spaces of both the group WUSs according to g, determine the lengths and start positions of the search spaces of both the group WUSs according to a*Rmax, and implicitly determine the start positions of the group WUSs according to group indexes of the group WUSs. For example, the start position of the group WUS1 is the start of the search space, the end position of the group WUS1 is the middle of the search space; and the start position of the group WUS2 is the middle of the search space, and the end position of the group WUS2 is the end of the search space. The terminal A detects the group WUS1 from the start of the search space, and the terminal B detects the group WUS2 from the middle of the search space.

Exemplary Embodiment 9

Specific Embodiment 1

In an NB-IoT system, it is assumed that a terminal A corresponds to a group WUS1. A corresponding interval g relative to a PO and an offset a with respect to the size of a PDCCH search space are configured by signalling.

During receiving, corresponding time domain locations are determined in the following manner: end positions of search spaces of all the WUSs are determined according to g, and the lengths and start positions of the search spaces of the all the group WUSs are determined according to a*Rmax. Detection is performed from the start of the search space. During detection, a corresponding sequence is $w_1(m)$, specifically as described in embodiment 10, and it will not be repeated herein.

If a corresponding group WUS is detected, the terminal detects a corresponding PDCCH; otherwise, the terminal does not detect a PDCCH.

Specific Embodiment 2

In an MTC system, it is assumed that a terminal A corresponds to a group WUS1. A corresponding interval g relative to a PO, and an offset a with respect to the size of a PDCCH search space are configured by signalling, and an initial resource block index of the group WUS in a narrowband is configured as 0 by signalling.

During receiving, corresponding frequency domain locations are: resource block indexes 0 and 1 in the narrowband. During receiving, corresponding time domain locations are determined in the following manner: an end position of a search space of the WUS is determined according to g, and the length and start position of the search space of the group WUS are determined according to a*Rmax. Detection is performed from the start of the search space. During detection, a corresponding sequence is $w_1(m)$, specifically as described in embodiment 10, and it will not be repeated herein.

If a corresponding group WUS is detected, the terminal detects a corresponding PDCCH; otherwise, the terminal does not detect a PDCCH.

Specific Embodiment 3

In an MTC system, it is assumed that a terminal A corresponds to a group WUS1 and a terminal B corresponds to a group WUS2. A corresponding interval g relative to a PO and an offset a relative to the size of a PDCCH search space are configured by signalling, and initial resource block indexes of the group WUS1 and the group WUS2 in a narrowband are configured as 0 and 2 by signaling, respectively.

During detection, corresponding frequency domain locations are: resource block indexes 0 and 1 of the group WUS1 in the narrowband; and resource block indexes 2 and 3 of the group WUS2 in the narrowband.

During detection, corresponding time domain locations are determined in the following manner: end positions of search spaces of both the group WUSs are determined by the terminal A and the terminal B according to g, and the lengths and start positions of the search spaces of both the group WUSs are determined according to a*Rmax. Detection is performed from the starts of the search spaces, and sequences used by the terminal A and the terminal B are:

$$w_k(m) = \theta n_f, n_s(m) * e^{-\frac{j\pi u n(n+1)}{131}}$$

$$m = 0, 1, \ldots, 132M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$k = 1, 2$$

wherein $M_k$ is a subframe required for transmitting the group WUS, $c_{n_f,n_s}(i)$, i=0, 1, ..., $2*132M_k-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_D^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index.

If a corresponding group WUS is detected, the terminal detects a corresponding PDCCH; otherwise the terminal does not detect a PDCCH.

Specific Embodiment 4

In an NB-IoT system, it is assumed that a terminal A corresponds to a group WUS1 and a terminal B corresponds to a group WUS2. Intervals g1 and g2, and offsets a1 and a2 are configured by signalling.

During detection, corresponding time domain locations are determined in the following manner: the terminal A determines an end position of a search space of the group WUS1 according to g1, determines the length and start position of the search space of the group WUS1 according to a1*Rmax, and detects the group WUS1 in the determined search space; and the terminal B determines an end position of a search space of the group WUS2 according to g2, determines the length and start position of the search space of the group WUS2 according to a2*Rmax, and detects the group WUS2 in the determined search space. During detection, sequences corresponding to the group WUS1 and the group WUS2 are:

$$w_k(m) = \theta n_f, n_s(m) * e^{-\frac{j\pi u n(n+1)}{131}}$$

$$m = 0, 1, \ldots, 132M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$k = 1, 2$$

wherein $M_k$ is a subframe required for transmitting the group WUS, $c_{n_f,n_s}(i)$, i=0, 1, . . . , $2*32M_k-1$ is a PN sequence, and an initial value is $$c_{init\_WUS} = (N_{ID}^{Cell} + 1)\left(\left(10n_{f\_start\_PO} + \left\lfloor\frac{n_{s\_start\_PO}}{2}\right\rfloor\right)\mathrm{mod}2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Other forms of sequences are not excluded.

If a corresponding group WUS is detected, the terminal detects a corresponding PDCCH; otherwise, the terminal does not detect a PDCCH.

Specific Embodiment 5

In an NB-IoT system, it is assumed that a terminal A corresponds to a group WUS1 and a terminal B corresponds to a group WUS2. And g and offsets a1 and a2 are configured by signalling.

During detection, corresponding time domain locations are determined in the following manner: the terminal A and the terminal B determine end positions of search spaces of both the group WUSs according to g, determine the length of the search space of the group WUS1 according to a1*Rmax, determine the length of the search space of the group WUS2 according to a2*Rmax, and determine start positions of the search spaces of both the group WUSs according to the lengths of the search spaces of the group WUS1 and the group WUS2. The terminal A performs detection from the start of the search space, and the terminal B starts detection from the middle of the search space.

During detection, a corresponding sequence is:

$$w_k(m) = \frac{1 - 2c(2m')}{\sqrt{2}} + j\frac{1 - 2c(2m'+1)}{\sqrt{2}}$$

$$m = 0, 1, \ldots, 131$$

$$m' = m + 132x$$

$$k = 1, 2$$

c(i), i=0, 1, . . . , $2*32M_k-1$s is a PN sequence, and an initial value is $$c_{init\_WUS} = (h)*2^{29} +$$
$$(N_{ID}^{Cell} + 1)\left(\left(10n_{f\_start\_PO} + \left\lfloor\frac{n_{s\_start\_PO}}{2}\right\rfloor\right)\mathrm{mod}2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $N_{ID}^{Cell}$ is a cell index, and h is a fixed value. Other forms of sequences are not excluded.

If a corresponding group WUS is detected, the terminal detects a corresponding PDCCH; otherwise, the terminal does not detect a PDCCH.

Specific Embodiment 6

In an NB-IoT system, it is assumed that a terminal A corresponds to a group WUS1 and a terminal B corresponds to a group WUS2. The interval g and offset a are configured by signalling.

During detection, corresponding time domain locations are determined in the following manner: end positions of search spaces of both the group WUSs are determined according to g, and the lengths of the search spaces of both the group WUSs are determined according to a*Rmax. The terminal A detects the group WUS1 from the start of the search space from front to back, and the terminal B detects the group WUS2 from the search space from back to front. During detection, a corresponding sequence is:

$$w_k(m) = \theta n_f, n_s(m) * e^{-\frac{j\pi un(n+1)}{131}}$$

$$m = 0, 1, \ldots, 132M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$k = 1, 2$$

wherein $M_k$ is a subframe required for transmitting the group WUS, $c_{n_f,n_s}(i)$, i=0, 1, . . . , $2*32M_k-1$ is a PN sequence, and an initial value is $$c_{init\_WUS} = (N_{ID}^{Cell} + 1)\left(\left(10n_{f\_start\_PO} + \left\lfloor\frac{n_{s\_start\_PO}}{2}\right\rfloor\right)\mathrm{mod}2048 + 1\right)*2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Other forms of sequences are not excluded.

If a corresponding group WUS is detected, the terminal detects a corresponding PDCCH; otherwise, the terminal does not detect a PDCCH.

Specific Embodiment 7

In an NB-IoT system, it is assumed that a terminal A corresponds to a group WUS1, and a terminal B corresponds to a group WUS2. The interval g and offset a are configured by signaling. A start position of the group WUS1 is the start position of the search space, and a start position of the group WUS2 is the middle of the search space.

During detection, corresponding time domain locations are determined in the following manner: end positions of search spaces of both the group WUSs are determined according to g, and the lengths of the search spaces of both the group WUSs are determined according to a*Rmax. The terminal A and the terminal B determine the positions of the corresponding group WUSs in the search spaces according to the configured positions of the group WUSs in the search spaces. For example, the terminal A performs detection from the start of the search space, and the terminal B starts detection from the middle of the search space. Sequences used by the terminal A and the terminal B are:

$$w_k(m) = \theta_{n_f, n_s}(m) * e^{-\frac{j\pi u n(n+1)}{131}}$$

$$m = 0, 1, \ldots, 132M_k - 1$$

$$n = m \bmod 132$$

$$\theta_{n_f, n_s}(m) = \begin{cases} 1, & \text{if } c_{n_f, n_s}(2m) = 0 \text{ and } c_{n_f, n_s}(2m+1) = 0 \\ -1, & \text{if } c_{n_f, n_s}(2m) = 0 \text{ and } c_{n_f, n_s}(2m+1) = 1 \\ j, & \text{if } c_{n_f, n_s}(2m) = 0 \text{ and } c_{n_f, n_s}(2m+1) = 0 \\ -j, & \text{if } c_{n_f, n_s}(2m) = 1 \text{ and } c_{n_f, n_s}(2m+1) = 1 \end{cases}$$

wherein $M_k$ is a subframe required for transmitting the group WUS, $c_{n_f,n_s}(i)$, i=0, 1, . . . , 2*32$M_k$−1 is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, u=($N_{ID}^{Ncell}$ mod 126)+3, and $N_{ID}^{Cell}$ is a cell index. Other forms of sequences are not excluded.

If a corresponding group WUS is detected, the terminal detects a corresponding PDCCH; otherwise, the terminal does not detect a PDCCH.

Specific Embodiment 8

In an NB-IoT system, it is assumed that a terminal A corresponds to a group WUS1 and a terminal B corresponds to a group WUS2. The interval g and offset a are configured by signalling.

During detection, corresponding time domain locations are determined in the following manner: end positions of search spaces of both the group WUSs are determined according to g, and the lengths of the search spaces of both the group WUSs are determined according to a*Rmax. The terminal A implicitly determines the position of the corresponding group WUS within the search space according to a group index of the group WUS. For example, the terminal A performs detection from the start of the search space, the detected end position being the middle of the search space; and the terminal B starts mapping from the middle of the search space, the detected end position being the end of the search space. Sequences used by the terminal A and the terminal B are:

$$w_k(m) = \theta_{n_f, n_s}(m) * e^{-\frac{j\pi u n(n+1)}{131}}$$

$$m = 0, 1, \ldots, 132M_k - 1$$

$$n = m \bmod 132$$

$$\theta_{n_f, n_s}(m) = \begin{cases} 1, & \text{if } c_{n_f, n_s}(2m) = 0 \text{ and } c_{n_f, n_s}(2m+1) = 0 \\ -1, & \text{if } c_{n_f, n_s}(2m) = 0 \text{ and } c_{n_f, n_s}(2m+1) = 1 \\ j, & \text{if } c_{n_f, n_s}(2m) = 0 \text{ and } c_{n_f, n_s}(2m+1) = 0 \\ -j, & \text{if } c_{n_f, n_s}(2m) = 1 \text{ and } c_{n_f, n_s}(2m+1) = 1 \end{cases}$$

wherein $M_k$ is a subframe required for transmitting the group WUS, $c_{n_f,n_s}(i)$, i=0, 1, . . . , 2*32$M_k$−1 is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, u=($N_{ID}^{Ncell}$ mod 126)+3, and $N_{ID}^{Cell}$ is a cell index. Other forms of sequences are not excluded.

If a corresponding group WUS is detected, the terminal detects a corresponding PDCCH; otherwise, the terminal does not detect a PDCCH.

Specific Embodiment 9

It is assumed that a terminal A corresponds to a group WUS1. When Rmax configured is greater than or equal to a threshold value, the group WUS1 is detected according to Specific Embodiment 1 (or Specific Embodiment 2); otherwise, the group WUS1 is detected according to Specific Embodiment 4 (or Specific Embodiment 5, or Specific Embodiment 6, or Specific Embodiment 7, or Specific Embodiment 8), wherein threshold value is preset.

Specific Embodiment 10

It is assumed that a terminal B corresponds to a group WUS2. The interval a and the Rmax are configured by signaling. When a*Rmax is greater than or equal to a threshold value, the group WUS2 is detected according to Specific Embodiment 1 (or Specific Embodiment 2); otherwise, the group WUS2 is detected according to Specific Embodiment 4 (or Specific Embodiment 5, or Specific Embodiment 6, or Specific Embodiment 7, or Specific Embodiment 8), wherein the threshold value is preset.

Specific Embodiment 11

It is assumed that a terminal A corresponds to a group WUS1. When the number of groups configured is K, if K is greater than or equal to a fixed value of 3, the group WUS1 is detected according to Specific Embodiment 4 (or Specific Embodiment 5, or Specific Embodiment 6, or Specific Embodiment 7, or Specific Embodiment 8); otherwise, the group WUS1 is detected according to Specific Embodiment 3.

Specific Embodiment 12

It is assumed that a terminal A corresponds to a group WUS1. When the number of groups configured is K and is greater than a threshold value of 2, the group WUS1 is detected according to Specific Embodiment 4 (or Specific Embodiment 5, or Specific Embodiment 6, or Specific Embodiment 7, or Specific Embodiment 8); otherwise, the group WUS1 is detected according to Specific Embodiment 3.

Specific Embodiment 13

It is assumed that a terminal A corresponds to a group WUS1. The terminal detects the group WUS according to Specific Embodiment 1 (or Specific Embodiment 2) and Specific Embodiment 4 (or Specific Embodiment 5, or Specific Embodiment 6, or Specific Embodiment 7, or Specific Embodiment 8). Only when the group WUS1 cannot be detected in accordance with the two ways, the terminal does not detect a PDCCH.

Specific Embodiment 14

In an MTC system, it is assumed that a terminal A corresponds to a group WUS1, a terminal B corresponds to a group WUS2, a terminal C corresponds to a group WUS3 and a terminal D corresponds to a group WUS4. The interval g and offset a are configured by signalling. It is assumed that B=33. It is assumed that a base station configures that initial resource block indexes of the group WUS1 and the group WUS2 in a narrowband are 0, and initial resource block indexes of the group WUS3 and the group WUS4 in the narrowband are 2.

During detection, corresponding frequency domain locations are as follows: the terminal A detects the group WUS1 in resource block indexes 0 and 1 of the narrowband; the terminal B detects the group WUS2 in resource block indexes 0 and 1 of the narrowband; the terminal C detects the group WUS3 in resource block indexes 2 and 3 of the narrowband; and the terminal D detects the group WUS4 in resource block indexes 2 and 3 of the narrowband.

During detection, corresponding time domain locations are determined in the following manner: end positions of search spaces of all the group WUSs are determined according to g, and the lengths of the search spaces of all the group WUSs are determined according to a*Rmax. Detection is started from the starts of the search spaces.

During detection, a sequence used by the terminal A is:

$$w_1(m) = \theta n_f, n_s(m) * e^{-\frac{j\pi un(n+1)}{131}} * e^{-2\pi n\eta}$$

$$m = 0, 1, \ldots, 132M_1 - 1$$

$$n = m \bmod 132$$

$$\eta = \frac{33}{132}$$

A sequence used by the terminal B is:

$$w_2(m) = \theta n_f, n_s(m) * e^{-\frac{j\pi un(n+1)}{131}} * e^{-2\pi n\eta}$$

$$m = 0, 1, \ldots, 132M_1 - 1$$

$$n = m \bmod 132$$

$$\eta = \frac{33}{132} * 2$$

A sequence used by the terminal C is:

$$w_3(m) = \theta n_f, n_s(m) * e^{-\frac{j\pi un(n+1)}{131}} * e^{-2\pi n\eta}$$

$$m = 0, 1, \ldots, 132M_3 - 1$$

$$n = m \bmod 132$$

$$\eta = \frac{33}{132}$$

A sequence used by the terminal D is:

$$w_4(m) = \theta n_f, n_s(m) * e^{-\frac{j\pi un(n+1)}{131}} * e^{-2\pi n\eta}$$

$$m = 0, 1, \ldots, 132M_4 - 1$$

$$n = m \bmod 132$$

$$\eta = \frac{33}{132} * 2$$

wherein $$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

wherein $M_i$ is a subframe required when the group WUS is transmitted, $c_{n_f,n_s}(i)$, i=0, 1, . . . , $2*132M_i-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Other sequences are not excluded.

If a corresponding group WUS is detected, the terminal detects a corresponding PDCCH; otherwise, the terminal does not detect a PDCCH.

Specific Embodiment 15

In an MTC system, it is assumed that a terminal A corresponds to a group WUS1, a terminal B corresponds to a group WUS2, a terminal C corresponds to a group WUS3, and a terminal D corresponds to a group WUS4. The interval g and offset a are configured by signalling. It is assumed that B=33.

During detection, corresponding time domain locations are determined in the following manner: end positions of search spaces of all the group WUSs are determined according to g, and the lengths of the search spaces of all the group WUSs are determined according to a*Rmax. As a group index of the terminal A is 1, ceil (group index/2)=1 is satisfied, the terminal A starts detection from the start of the search space. As a group index of the terminal B is 2, ceil (group index/2)=1 is satisfied, the terminal B starts detection from the start of the search space. As a group index of the terminal C is 3, ceil(group index/2)=2 is satisfied, the terminal C starts detection from the end of the search space. The case of the terminal D is the same as that of the terminal C. The sequences used are listed as follows.

A sequence used by the terminal A is:

$$w_1(m) = \theta n_f, n_s(m) * e^{-\frac{j\pi un(n+1)}{131}} * e^{-2\pi n\eta}$$

$$m = 0, 1, \ldots, 132M_1 - 1$$

$$n = m \bmod 132$$

$$\eta = \frac{33}{132}.$$

A sequence used by the terminal B is:

$$w_2(m) = \theta n_f, n_s(m) * e^{-\frac{j\pi un(n+1)}{131}} * e^{-2\pi n\eta}$$

$$m = 0, 1, \ldots, 132M_2 - 1$$

$$n = m \bmod 132$$

$$\eta = \frac{33}{132} * 2.$$

A sequence used by the terminal C is:

$$w_3(m) = \theta n_f, n_s(m) * e^{-\frac{j\pi un(n+1)}{131}} * e^{-2\pi n\eta}$$

$$m = 0, 1, \ldots, 132M_3 - 1$$

$$n = m \bmod 132$$

$$\eta = \frac{33}{132}.$$

A sequence used by the terminal D is:

$$w_4(m) = \theta n_f, n_s(m) * e^{-\frac{j\pi un(n+1)}{131}} * e^{-2\pi n\eta}$$

$$m = 0, 1, \ldots, 132M_4 - 1$$

$$n = m \bmod 132$$

$$\eta = \frac{33}{132} * 2$$

wherein $$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

wherein $M_k$ is a subframe required when the group WUS is transmitted, $c_{n_f,n_s}(i)$, $i=0, 1, \ldots, 2*132M_t-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. Other sequences are not excluded.

If a corresponding group WUS is detected, the terminal detects a corresponding PDCCH; otherwise, the terminal does not detect a PDCCH.

Specific Embodiment 16

In an NB-IoT system, it is assumed that a terminal A corresponds to a group WUS1, a terminal B corresponds to a group WUS2, a terminal C corresponds to a group WUS3, and a terminal D corresponds to a group WUS4. The interval g and offset a are configured by signaling. It is assumed that B=33.

During detection I, corresponding time domain locations are determined in the following manner: end positions of search spaces of all the group WUSs are determined according to g, and the lengths of the search spaces of all the group WUSs are determined according to a*Rmax, thereby obtaining start positions of the search spaces of the group WUSs. The terminal A, the terminal B, the terminal C and the terminal D perform detection from the starts position of the search spaces. Sequences used during the detection are as shown in Embodiment 8.

During detection II, corresponding time domain locations are determined in the following manner: end positions of the search spaces of all the group WUSs are determined according to g, and the lengths of the search spaces of all the group WUSs are determined according to a*Rmax. The terminal A performs detection from the start of the search space to 1/y1 of the search space; the terminal B performs detection from 1/y2 to 1/y3 of the search space; the terminal C performs detection from 1/y4 to 1/y5 of the search space; and the terminal D performs detection from 1/y6 of the search space to the end of the search space (intervals between the group WUSs and a PO are different). The values of y1, y2, y3, y4, y5 and y6 are preset values or configured by signaling, or obtained by means of start positions configured by signaling. During detection, a sequence used by a subframe x is as follows:

$$w_k(m) = \theta n_f, n_s(m') * e^{-\frac{j\pi un(n+1)}{131}}$$

$$m = 0, 1, \ldots, 131$$

$$m' = m + 132x$$

$$n = m \bmod 132$$

$$\theta n_f, n_s(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 0 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

wherein $M_k$ is a subframe required when the group WUS is transmitted, $c_{n_f,n_s}(i)$, $i=0, 1, \ldots, 2*32M_k-1$ is a PN sequence, and an initial value is $$c_{init\_WUS} = (N_{ID}^{Cell} + 1)\left(\left(10 n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{s\_start\_PO}$ is the first time slot corresponding to the PO, $u=(N_{ID}^{Ncell} \bmod 126)+3$, and $N_{ID}^{Cell}$ is a cell index. B is a preset value, or the specific value of B is related to the number of groups. If a group index k is numbered from 0, h=1. Other sequences are not excluded.

Only when corresponding group WUSs are not detected in both detection I and detection II, the terminal does not detect a PDCCH.

Specific Embodiment 17

In an MTC system, it is assumed that a terminal A corresponds to a group WUS1, a terminal B corresponds to a group WUS2, a terminal C corresponds to a group WUS3 and a terminal D corresponds to a group WUS4. The interval g and offset a are configured by signalling. It is assumed that B=33. Initial resource block indexes of the group WUS1 and the group WUS2 in a narrowband are indicated as 0 by signaling, and initial resource block indexes of the group WUS3 and the group WUS4 in the narrowband are indicated as 2 by signaling.

During detection, corresponding frequency domain locations are as follows: the terminal A and the terminal B perform detection on resource block indexes 0 and 1 of the narrowband; and the terminal C and the terminal D perform detection on resource block indexes 2 and 3 of the narrowband.

During detection, corresponding time domain locations are determined in the following manner: end positions of search spaces of all the group WUSs are determined according to g, and the lengths of the search spaces of all the group WUSs are determined according to a*Rmax. As a group index of the terminal A is 1, mod(group index, 2)=1 is satisfied, detection is started from the start of the search space; as a group index of the terminal B is 2, mod(group index, 2)=0 is satisfied, detection is started from the end of the search space; as a group index corresponding to the terminal C is 3, mod(group index, 2)=1 is satisfied, detection is started from the start of the search space; and a group index corresponding to the terminal D is 4, mod(group index, 2)=0 is satisfied, detection is started from the end of the search space. Sequences used by the terminal A, the terminal B, the terminal C and the terminal D are:

$$w_k(m) = \theta n_f, n_s(m) * e^{-\frac{j\pi un(n+1)}{131}}$$

$$m = 0, 1, \ldots, 132M_k - 1$$

$$n = m \bmod 132$$

$$\theta n_f, n_s(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 0 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases}$$

$$k = 1, 2, 3, 4$$

wherein $M_k$ is a subframe required when the group WUS is transmitted, $c_{n_f,n_s}(i)$, $i=0, 1, \ldots, 2*32M_k-1$ is a PN sequence, and an initial value is $$c_{init\_WUS} = (N_{ID}^{Cell} + 1)\left(\left(10n_{f\_start\_PO} + \left\lfloor \frac{n_{s\_start\_PO}}{2} \right\rfloor\right) \bmod 2048 + 1\right) * 2^9 + N_{ID}^{Cell},$$

wherein $n_{f\_start\_PO}$ is the first radio frame of the first PO corresponding to the WUS, $n_{f\_start\_PO}$ is the first time slot corresponding to the PO, and $N_{ID}^{Cell}$ is a cell index. Other sequences are not excluded.

If a corresponding group WUS is detected, the terminal detects a corresponding PDCCH; otherwise, the terminal does not detect a PDCCH.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/ Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment 2

In the present embodiment, an apparatus for transmitting a signal is also provided. The apparatus is used for implementing the described embodiments and exemplary implementations, and what has been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 5:
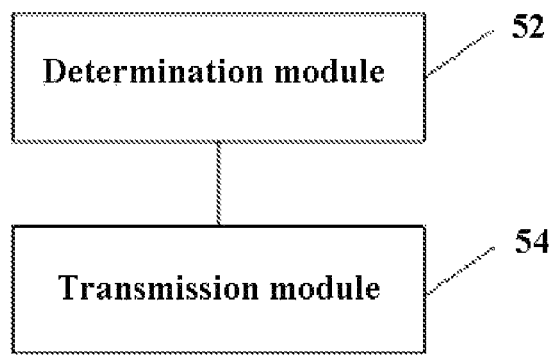
FIG. 5 is a structure block diagram of an apparatus for transmitting a signal according to some embodiments of the present disclosure.

FIG. 5 is a structure block diagram of the apparatus for transmitting a signal according to some embodiments of the present disclosure. The apparatus for transmitting the signal is applied to a base station. As shown in FIG. 5, the apparatus includes:

1) a determination module 52, configured to determine transmission information of a group Wake up signal (WUS) according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals.

In one or more exemplary implementations of the present embodiment, the one or more sequences corresponding to the group WUS include at least one of the following: a ZC sequence, a PN sequence, and an orthogonal sequence. When the sequence corresponding to the group WUS is the ZC sequence, a cyclic shift of the ZC sequence corresponding to the group WUS is determined at least according to a group index corresponding to the group WUS. When the sequences corresponding to the group WUS are the ZC sequence and the PN sequence, an initial value of the PN sequence corresponding to the group WUS is determined at least according to the group index corresponding to the group WUS. When the sequences corresponding to the group WUS are the ZC sequence, a first PN sequence and a second PN sequence, an initial value of the second PN sequence corresponding to the group WUS is determined at least according to the group index corresponding to the group WUS. When the sequence corresponding to the group WUS is the PN sequence, an initial value of the PN sequence corresponding to the group WUS is determined at least according to the group index corresponding to the group WUS. When the sequence corresponding to the group WUS includes the orthogonal sequence, a sequence index of the orthogonal sequence is determined at least according to the group index corresponding to the group WUS.

In one or more exemplary implementations of the present embodiment, the frequency domain location information corresponding to the group WUS at least includes: a start resource location in a narrowband where the group WUS is located.

In one or more exemplary implementations of the present embodiment, the time domain location information corresponding to the group WUS includes at least one of: an interval between the group WUS and a Paging Occasion (PO), an offset of the group WUS with respect to a size of a Physical Downlink Control Channel (PDCCH) search space, and a start position of the group WUS in a search space.

The interval between the group WUS and the PO and the offset of the group WUS with respect to the size of the PDCCH search space can be configured by first signalling. Alternatively or Additionally, the interval between the group WUS and the PO, the offset with respect to the size of the PDCCH search space, and the start position of the group WUS in the search space can be configured by second signalling.

In one or more exemplary implementations of the present embodiment, group WUSs corresponding to the same PO have the same offset with respect to the size of the PDCCH search space.

In one or more exemplary implementations of the present embodiment, when any one of the group WUSs corresponding to the same PO has a length greater than or equal to X1, the intervals between the PO and the group WUSs corresponding to the same PO are different; and when the group WUS has a length smaller than X2, the intervals between the PO and the group WUSs corresponding to the same PO are the same, wherein X1 and X2 are positive integers greater than or equal to 0.

In one or more exemplary implementations of the present embodiment, when any one of the group WUSs corresponding to the same PO has a length equal to X3, the intervals between the PO and the group WUSs corresponding to the same PO are different; and when the group WUS has a length equal to X4, the intervals between the PO and the group WUSs corresponding to the same PO are the same, wherein X3 and X4 are positive integers greater than or equal to 0.

2) A transmission module 54, configured to transmit the group WUS according to the transmission information.

By means of the apparatus shown in FIG. 5, transmission information of a group Wake up signal (WUS) is determined according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals; and the group WUS is transmitted according to the transmission information. That is to say, by transmitting a group WUS, one or more terminals corresponding to the group WUS are woken up to detect a PDCCH, rather than all terminals being woken up to detect the PDCCH. The scheme solves the problem in the related art of non-obvious power consumption reduction effect of a terminal caused by high number of times of unnecessary PDCCH detections performed by the terminal, and achieves the technical effect of further reducing the power consumption of the terminal.

Figure 6:
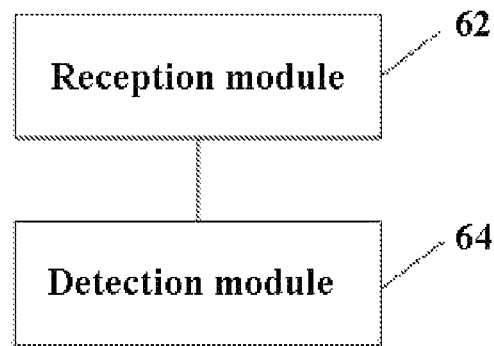
FIG. 6 is a structure block diagram of an apparatus for receiving a signal according to some embodiments of the present disclosure.

The present embodiment further provides an apparatus for receiving a signal. FIG. 6 is a structure block diagram of the apparatus for receiving a signal according to some embodiments of the present disclosure, which is applied to a terminal. As shown in FIG. 6, the apparatus includes:

1) a reception module 62, configured to receive a group WUS transmitted by a base station; and 2) a detection module 64, configured to detect the group WUS according to a group index of the group Wake up signal (WUS) corresponding to a terminal and configuration information of the group WUS, wherein the group WUS is a WUS corresponding to a group of one or more terminals.

In one or more exemplary implementations of the present embodiment, the group index of the group WUS is determined according to a first terminal index, wherein the first terminal index is at least related to a DRX cycle period, a radio frame index, a DRX cycle index, a second terminal index and an index of a cell where the terminal is located.

In one or more exemplary implementations of the present embodiment, the configuration information of the group WUS includes at least one of: one or more sequences corresponding to the group WUS, time domain location information corresponding to the group WUS, and frequency domain location information corresponding to the group WUS.

The one or more sequences corresponding to the group WUS include at least one of: a ZC sequence, a PN sequence, and an orthogonal sequence. When the sequence corresponding to the group WUS is the ZC sequence, a cyclic shift of the ZC sequence corresponding to the group WUS is determined at least according to a group index corresponding to the group WUS. When the sequences corresponding to the group WUS are the ZC sequence and the PN sequence, an initial value of the PN sequence corresponding to the group WUS is determined at least according to the group index corresponding to the group WUS. When the sequences corresponding to the group WUS are the ZC sequence, a first PN sequence and a second PN sequence, an initial value of the second PN sequence corresponding to the group WUS is determined at least according to the group index corresponding to the group WUS. When the sequence corresponding to the group WUS is the PN sequence, an initial value of the PN sequence corresponding to the group WUS is determined at least according to the group index corresponding to the group WUS. When the sequence corresponding to the group WUS includes the orthogonal sequence, a sequence index of the orthogonal sequence is determined at least according to the group index corresponding to the group WUS.

In one or more exemplary implementations of the present embodiment, the frequency domain location information corresponding to the group WUS at least includes: a start resource location in a narrowband where the group WUS is located.

In one or more exemplary implementations of the present embodiment, the start resource location in the narrowband where the group WUS is located may be determined according to third signalling; or the start resource location in the narrowband where the group WUS is located is determined according to a fixed start resource location in the narrowband where the group WUS is located; or the start resource location in the narrowband where the group WUS is located is determined according to the group index corresponding to the group WUS.

In one or more exemplary implementations of the present embodiment, the time domain location information corresponding to the group WUS includes at least one of: an interval between the group WUS and a Paging Occasion (PO), an offset of the group WUS with respect to a size of a Physical Downlink Control Channel (PDCCH) search space, and a start position of the group WUS in a search space.

The time domain location information corresponding to the group WUS can be determined according to the interval between the group WUS and the PO and the offset of the group WUS relative to the size of the PDCCH search space, which are indicated by first signalling. The time domain location information corresponding to the group WUS can be determined according to the interval between the group WUS and the PO, the offset with respect to the size of the PDCCH search space and the start position of the group WUS in the search space, which are indicated by second signalling.

By means of the apparatus as shown in FIG. 6, a group WUS transmitted by a base station is detected according to a group index of the group Wake up signal (WUS) corresponding to a terminal and configuration information of the group WUS, wherein the group WUS is a WUS corresponding to a group of one or more terminals. That is to say, by detecting a group WUS transmitted by a base station, one or more terminals corresponding to the group WUS are woken up to detect a PDCCH, rather than all terminals being woken up to detect the PDCCH. The scheme solves the problem in the related art of non-obvious power consumption reduction effect of a terminal caused by high number of times of unnecessary PDCCH detections performed by the terminal, and achieves the technical effect of further reducing the power consumption of the terminal.

It should be noted that the described modules may be implemented by software or hardware. The latter may be implemented in the following manner, but is not limited thereto: all the modules are located in the same processor, or the modules are located in different processors in an arbitrary combination.

Embodiment 3

Some embodiments of the present disclosure further provide a storage medium. The storage medium has computer programs stored therein, wherein the computer programs are configured to execute, when running, operations in any one of the method embodiments.

In one or more exemplary implementations of the present embodiment, in the present embodiment, the storage medium may be configured to store a computer program for executing the following operations:

S1, transmission information of a group Wake up signal (WUS) is determined according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals; and S2, the group WUS is transmitted according to the transmission information.

In one or more exemplary implementations of the present embodiment, the storage medium is further configured to store a computer program for executing the following operations:

S1, a group WUS transmitted by a base station is received; and

S2: the group Wake up signal (WUS) is detected according to a group index of the group WUS corresponding to a terminal and configuration information of the group WUS, wherein the group WUS is a WUS corresponding to a group of one or more terminals.

In one or more exemplary implementations of the present embodiment, the storage medium may include but is not limited to: any media that can store computer programs, such as a USB flash drive, a Read-Only Memory (ROM for short), a Random Access Memory (RAM for short), a removable hard disk, a magnetic disk, or an optical disc.

Some embodiments of the present disclosure further provide an electronic apparatus, including a memory and a processor. Computer programs are stored in the memory, and the processor is configured to run the computer programs to execute operations in any one of the method embodiments.

In one or more exemplary implementations of the present embodiment, the electronic apparatus can further include a transmission apparatus and an input-output apparatus, wherein the transmission apparatus is connected to the processor, and the input-output apparatus is connected to the processor.

In one or more exemplary implementations of the present embodiment, the processor may be configured to execute the following operations by means of a computer program:

S1, transmission information of a group Wake up signal (WUS) is determined according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals; and S2, the group WUS is transmitted according to the transmission information.

In one or more exemplary implementations of the present embodiment, the processor is further configured to store a computer program for executing the following operations:

S1, a group WUS transmitted by a base station is received; and

S2: the group Wake up signal (WUS) is detected according to a group index of the group WUS corresponding to a terminal and configuration information of the group WUS, wherein the group WUS is a WUS corresponding to a group of one or more terminals.

In one or more exemplary implementations of the present embodiment, for specific examples in the present embodiment, reference can be made to the examples described in the described embodiments and exemplary embodiments, and thus they will not be repeated again in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A method for transmitting a signal performed by a base station, comprising:
determining transmission information of a group Wake up signal (WUS) according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals; and
transmitting the group WUS according to the transmission information;
wherein the one or more sequences corresponding to the group WUS comprise at least one of: a Zadoff-Chu (ZC) sequence, a Pseudo-noise (PN) sequence, and an orthogonal sequence;
when the sequence corresponding to the group WUS is the ZC sequence, a cyclic shift of the ZC sequence corresponding to the group WUS is determined at least according to a group index corresponding to the group WUS;
when the sequence corresponding to the group WUS is the PN sequence, an initial value of the PN sequence corresponding to the group WUS is determined at least according to the group index corresponding to the group WUS; and
when the sequence corresponding to the group WUS comprises the orthogonal sequence, a sequence index of the orthogonal sequence is determined at least according to the group index corresponding to the group WUS.

2. The method according to claim 1, wherein
when the sequences corresponding to the group WUS are the ZC sequence and the PN sequence, an initial value of the PN sequence corresponding to the group WUS is determined at least according to the group index corresponding to the group WUS;
when the sequences corresponding to the group WUS are the ZC sequence, a first PN sequence and a second PN sequence, an initial value of the second PN sequence corresponding to the group WUS is determined at least according to the group index corresponding to the group WUS.

3. The method according to claim 1, wherein
the frequency domain location information corresponding to the group WUS at least comprises: a start resource location in a narrowband where the group WUS is located.

4. The method according to claim 1, wherein the time domain location information corresponding to the group WUS comprises at least one of:
an interval between the group WUS and a Paging Occasion (PO), an offset of the group WUS with respect to a size of a Physical Downlink Control Channel (PDCCH) search space, and a start position of the group WUS in a search space.

5. The method according to claim 4, further comprising at least one of:
configuring, by first signalling, the interval between the group WUS and the PO and the offset of the group WUS with respect to the size of the PDCCH search space; and configuring, by second signalling, the interval between the group WUS and the PO, the offset of the group WUS with respect to the size of the PDCCH search space, and the start position of the group WUS in the search space.

6. The method according to claim 4, wherein
a plurality of group WUSs corresponding to the same PO have the same offset with respect to the size of the PDCCH search space.

7. The method according to claim 4, wherein
when any one of the plurality of group WUSs corresponding to the same PO has a length greater than or equal to X1, the intervals between the PO and the plurality of group WUSs corresponding to the same PO are different; and when any one of the plurality of group WUSs corresponding to the same PO has a length smaller than X2, the intervals between the PO and the plurality of group WUSs corresponding to the same PO are the same, wherein X1 and X2 are positive integers greater than or equal to 0.

8. A method for receiving a signal performed by a terminal, comprising:
receiving a group Wake up signal (WUS) transmitted by a base station; and
detecting the group WUS according to a group index of the group WUS corresponding to a terminal and configuration information of the group WUS, wherein the group WUS is a WUS corresponding to a group of one or more terminals;
wherein the configuration information of the group WUS comprises at least one of: one or more sequences corresponding to the group WUS, time domain location information corresponding to the group WUS, and frequency domain location information corresponding to the group WUS;
wherein the one or more sequences corresponding to the group WUS comprise at least one of: a Zadoff-Chu (ZC) sequence, a Pseudo-noise (PN) sequence, and an orthogonal sequence;
when the sequence corresponding to the group WUS is the ZC sequence, a cyclic shift of the ZC sequence corresponding to the group WUS is determined at least according to a group index corresponding to the group WUS;
when the sequence corresponding to the group WUS is the PN sequence, an initial value of the PN sequence corresponding to the group WUS is determined at least according to the group index corresponding to the group WUS; and
when the sequence corresponding to the group WUS comprises the orthogonal sequence, a sequence index of the orthogonal sequence is determined at least according to the group index corresponding to the group WUS.

9. The method according to claim 8, further comprising:
determining the group index of the group WUS according to a first terminal index, wherein the first terminal index is at least related to a Discontinuous Reception (DRX) cycle period, a radio frame index, a DRX cycle index, a second terminal index and an index of a cell where the terminal is located.

10. The method according to claim 8, wherein
the one or more sequences corresponding to the group WUS comprise at least one of: a ZC sequence, a Pseudo-noise (PN) sequence, and an orthogonal sequence;

when the sequence corresponding to the group WUS is the ZC sequence, a cyclic shift of the ZC sequence corresponding to the group WUS is determined at least according to a group index corresponding to the group WUS;

when the sequences corresponding to the group WUS are the ZC sequence and the PN sequence, an initial value of the PN sequence corresponding to the group WUS is determined at least according to the group index corresponding to the group WUS;

when the sequences corresponding to the group WUS are the ZC sequence, a first PN sequence and a second PN sequence, an initial value of the second PN sequence corresponding to the group WUS is determined at least according to the group index corresponding to the group WUS;

when the sequence corresponding to the group WUS is the PN sequence, an initial value of the PN sequence corresponding to the group WUS is determined at least according to the group index corresponding to the group WUS; and when the sequence corresponding to the group WUS comprises the orthogonal sequence, a sequence index of the orthogonal sequence is determined at least according to the group index corresponding to the group WUS.

11. The method according to claim 8, wherein
the frequency domain location information corresponding to the group WUS at least comprises: a start resource location in a narrowband where the group WUS is located.

12. The method according to claim 11, wherein
the start resource location in the narrowband where the group WUS is located is determined according to third signalling; or the start resource location in the narrowband where the group WUS is located is determined according to a fixed start resource location in the narrowband where the group WUS is located; or the start resource location in the narrowband where the group WUS is located is determined according to the group index corresponding to the group WUS.

13. The method according to claim 8, wherein the time domain location information corresponding to the group WUS comprises at least one of:
an interval between the group WUS and a Paging Occasion (PO), an offset of the group WUS with respect to a size of a Physical Downlink Control Channel (PDCCH) search space, and a start position of the group WUS in a search space.

14. The method according to claim 13, further comprising:
determining the time domain location information corresponding to the group WUS according to the interval between the group WUS and the PO and the offset of the group WUS relative to the size of the PDCCH search space, which are indicated by first signalling; and determining the time domain location information corresponding to the group WUS according to the interval between the group WUS and the PO, the offset of the group WUS with respect to the size of the PDCCH search space and the start position of the group WUS in the search space, which are indicated by second signalling.

15. An apparatus for transmitting a signal, applied to a base station, and comprising a memory storing instructions and a processor in communication with the memory, wherein the processor, is configured to executing the instruction to:

determine transmission information of a group Wake up signal (WUS) according to at least one of the following configuration information: one or more sequences corresponding to the group WUS, time domain location information corresponding to the group WUS, and frequency domain location information corresponding to the group WUS, wherein the group WUS is a WUS corresponding to a group of one or more terminals; and transmit the group WUS according to the transmission information;

wherein the one or more sequences corresponding to the group WUS comprise at least one of: a Zadoff-Chu (ZC) sequence, a Pseudo-noise (PN) sequence, and an orthogonal sequence;

when the sequence corresponding to the group WUS is the ZC sequence, a cyclic shift of the ZC sequence corresponding to the group WUS is determined at least according to a group index corresponding to the group WUS;

when the sequence corresponding to the group WUS is the PN sequence, an initial value of the PN sequence corresponding to the group WUS is determined at least according to the group index corresponding to the group WUS; and when the sequence corresponding to the group WUS comprises the orthogonal sequence, a sequence index of the orthogonal sequence is determined at least according to the group index corresponding to the group WUS.

16. An apparatus for receiving a signal, applied to a terminal, and comprising: a memory storing instructions and a processor in communication with the memory, wherein the processor, is configured to executing the instruction to perform the method for receiving the signal of claim 8.

17. A non-transitory computer readable storage medium in which computer programs are stored, wherein the computer programs are configured to execute, when running, the method of claim 1.

18. The method according to claim 4, wherein when any one of the group WUSs corresponding to the same PO has a length equal to X3, the intervals between the PO and the group WUSs corresponding to the same PO are different; and when the group WUS has a length equal to X4, the intervals between the PO and the group WUSs corresponding to the same PO are the same, wherein X3 and X4 are positive integers greater than or equal to 0.

19. A non-transitory computer readable storage medium in which computer programs are stored, wherein the computer programs are configured to execute, when running, the method of claim 8.

* * * * *